(12) United States Patent
Fei et al.

(10) Patent No.: US 12,267,274 B2
(45) Date of Patent: Apr. 1, 2025

(54) REFERENCE SIGNAL SENDING METHOD, REFERENCE SIGNAL RECEIVING METHOD, APPARATUS, AND SYSTEM

(71) Applicant: Huawei Technologies Co., Ltd., Shenzhen (CN)

(72) Inventors: Yongqiang Fei, Shenzhen (CN); Xinqian Xie, Beijing (CN); Zhiheng Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 496 days.

(21) Appl. No.: 17/698,001

(22) Filed: Mar. 18, 2022

(65) Prior Publication Data

US 2022/0209922 A1 Jun. 30, 2022

Related U.S. Application Data

(63) Continuation of application No. PCT/CN2019/107121, filed on Sep. 20, 2019.

(51) Int. Cl.
*H04L 27/26* (2006.01)
*H04L 5/00* (2006.01)

(52) U.S. Cl.
CPC .................................. *H04L 5/0053* (2013.01)

(58) Field of Classification Search
CPC ......... H04L 25/02; H04L 25/03; H04L 27/26; H04L 5/00; H04L 5/0053; H04L 25/0224;
(Continued)

(56) References Cited

U.S. PATENT DOCUMENTS

2011/0228722 A1 9/2011 Noh et al.
2012/0207199 A1* 8/2012 Guo ...................... H04L 1/0027
375/308
(Continued)

FOREIGN PATENT DOCUMENTS

CN 106506111 A 3/2017
CN 107404370 A 11/2017
(Continued)

OTHER PUBLICATIONS

US 12,081,369 B2, 09/2024, Shimoda (withdrawn)*
(Continued)

*Primary Examiner* — Hassan A Phillips
*Assistant Examiner* — Prenell P Jones
(74) *Attorney, Agent, or Firm* — Leydig, Voit & Mayer, Ltd.

(57) ABSTRACT

A terminal receives configuration information of a first reference signal from a network device; and sends, based on the configuration information, uplink signals to the network device in at least two time units, wherein the uplink signals each comprise uplink data and the first reference signal, the at least two time units comprise a first time unit and a second time unit, the first time unit is adjacent to and located before the second time unit, the first reference signal is carried on the first N symbols in symbols that are in the second time unit and on which the uplink signal is located, the first reference signal is carried on the last M symbols in symbols that are in the first time unit and on which the uplink signal is located, and N and M are integers greater than or equal to 1.

12 Claims, 20 Drawing Sheets

(58) Field of Classification Search
CPC ............... H04L 5/0082; H04L 5/0094; H04L 5/0012; H04L 27/261
See application file for complete search history.

(56) References Cited

U.S. PATENT DOCUMENTS

| | | | | |
|---|---|---|---|---|
| 2018/0063865 | A1* | 3/2018 | Islam | H04L 5/0064 |
| 2018/0254869 | A1* | 9/2018 | Li | H04W 72/0446 |
| 2020/0045708 | A1* | 2/2020 | Hwang | H04L 5/0051 |
| 2021/0050933 | A1* | 2/2021 | Myung | H04L 5/0094 |
| 2021/0058949 | A1* | 2/2021 | Kim | H04W 72/23 |
| 2021/0314984 | A1* | 10/2021 | Yang | H04L 5/0044 |
| 2021/0367660 | A1* | 11/2021 | Jo | H04W 72/53 |
| 2022/0053482 | A1* | 2/2022 | Yang | H04L 5/0091 |
| 2022/0191903 | A1* | 6/2022 | Bae | H04L 1/1893 |

FOREIGN PATENT DOCUMENTS

| | | |
|---|---|---|
| CN | 108604976 A | 9/2018 |
| CN | 109274471 A | 1/2019 |
| EP | 3457797 A1 | 3/2019 |
| WO | 2018128453 A1 | 7/2018 |

OTHER PUBLICATIONS

"On UCI on PUSCH," 3GPP TSG-RAN WG1 #89, Hangzhou, China, R1-1709091, Total 5 pages, 3rd Generation Partnership Project, Valbonne, France (May 15-19, 2017).

"Discussion on DMRS density and structure to handle high Doppler case," 3GPP TSG RAN WG1 Meeting #83, Anaheim, USA, R1-157436, XP051022847, pp. 1-15, 3rd Generation Partnership Project, Valbonne, France (Nov. 15-22, 2015).

* cited by examiner

REFERENCE SIGNAL SENDING METHOD, REFERENCE SIGNAL RECEIVING METHOD, APPARATUS, AND SYSTEM

CROSS-REFERENCE TO RELATED APPLICATIONS

This application is a continuation of International Application No. PCT/CN2019/107121, filed on Sep. 20, 2019, the disclosure of which is hereby incorporated by reference in its entirety.

TECHNICAL FIELD

This application relates to the field of communication technologies, and in particular, to a reference signal sending method, a reference signal receiving method, an apparatus, and a system.

BACKGROUND

In a wireless communication system, for example, a new radio (NR) communication system, when data is transmitted between a terminal and a base station by using a radio signal, because a path loss of radio signal propagation is very severe in some deep-coverage scenarios such as a cell edge or a basement, coverage enhancement is required especially for uplink transmission. Because transmit power of the terminal is usually low, an uplink signal sent by the terminal cannot be correctly detected or demodulated on a base station side. To avoid the foregoing problem, when sending the uplink signal in a slot, the terminal usually includes a demodulation reference signal (DMRS) in the sent uplink signal, so that the base station can perform channel estimation based on the DMRS. In this way, channel equalization and data demodulation are performed on the received uplink signal based on an estimated channel.

When receiving an uplink signal repeatedly sent by the terminal in a plurality of slots, the base station may perform cross-slot joint channel estimation based on DMRSs in the uplink signals, to improve channel equalization and data demodulation performance of the uplink signals sent by the terminal. However, when the terminal repeatedly sends the uplink signal in the plurality of slots, if a phase jump may occur between different slots or in a same slot, cross-slot joint channel estimation cannot be performed when there is the phase jump.

SUMMARY

Embodiments of this application provide a reference signal sending method, an apparatus, and a system, to improve, when cross-time-unit joint channel estimation is performed, accuracy of determining whether cross-time-unit joint channel estimation can be performed across time units.

According to a first aspect, an embodiment of this application provides a reference signal sending method. The reference signal sending method may include:

receiving configuration information of a first reference signal from a network device; and sending, based on the configuration information, uplink signals to the network device in at least two time units, where the uplink signals each include uplink data and the first reference signal, the at least two time units include a first time unit and a second time unit, the first time unit is adjacent to and located before the second time unit, the first reference signal is carried on the first N symbols in symbols that are in the second time unit and on which the uplink signal is located, the first reference signal is carried on the last M symbols in symbols that are in the first time unit and on which the uplink signal is located, and N and M are integers greater than or equal to 1.

The first reference signal may be a DMRS, where the DMRS is used to demodulate data, or may be a jumping detection reference signal (JD-RS). Specifically, the first reference signal may be configured based on an actual requirement. It may be understood that, when the first reference signal is the JD-RS, the last M symbols that are used to carry the JD-RS and that are in the symbols that are in the first time unit and on which the uplink signal is located and the first N symbols that are used to carry the JD-RS and that are in the symbols that are in the second time unit and on which the uplink signal is located are jointly determined based on symbols on which DMRS signals are currently located.

The method provided in this embodiment may be executed by a terminal, or may be implemented by a chip in the terminal, for example, a baseband processor, or may be jointly implemented by a baseband processor and a radio frequency unit. When the foregoing method is implemented by the baseband processor, the receiving action may be understood as an operation of decoding a received signal to obtain configuration information, or may be understood as an operation of reading a signal input by the radio frequency unit. The action of sending the uplink signals may be understood as an action of generating uplink signals and outputting the uplink signals.

When the foregoing method is jointly implemented by the baseband processor and the radio frequency unit, the receiving action may be understood as an operation that the radio frequency unit receives a signal and performs down-conversion processing on the received signal, and the baseband processor decodes a signal output by a radio frequency signal to obtain configuration information; and the action of sending the uplink signals may be understood as an action that the baseband processor generates uplink signals and outputs the uplink signals, and the radio frequency unit sends the uplink signals.

It can be learned that, in the reference signal sending method provided in this embodiment of this application, in the two adjacent time units, the first reference signal is carried on the last M symbols in the symbols that are in the previous time unit and on which the uplink signal is located, and the first reference signal is carried on the first N symbols in the symbols that are in the subsequent time unit and on which the uplink signal is located. In this way, there is a small time interval between the first reference signal in the previous time unit and the first reference signal in the subsequent time unit. This can minimize a phase change caused by a channel change, and improve a probability of correctly determining, by the network device, whether there is a phase jump between different time units, thereby improving accuracy of determining whether cross-time-unit joint channel estimation can be performed across time units.

In a possible implementation, the first reference signal is carried on the first N symbols in symbols that are in each of the at least two time units and on which the uplink signal is located, and the first reference signal is carried on the last M symbols in the symbols that are in each of the at least two time units and on which the uplink signal is located. In this way, the terminal does not need to distinguish between the first time unit and the second time unit, so that complexity of the terminal is reduced.

In a possible implementation, the at least two time units include L time units, and L is an integer greater than 1.

The first reference signal is carried on the first N symbols in symbols that are in each of the last L−1 time units and on which the uplink signal is located, and the first reference signal is not carried in the $1^{st}$ time unit in the L time units; and the first reference signal is carried on the last M symbols in symbols that are in each of the first L−1 time units and on which the uplink signal is located, and the first reference signal is not carried in the last time unit in the L time units. This can reduce resource overheads occupied by the first reference signals in the first time unit and the second time unit.

In a possible implementation, because the first reference signals are used to determine whether there is a phase jump between two slots, the first reference signals do not need to be used to estimate channels on all frequencies in a transmission process. Therefore, in frequency domain, in symbols on which the first reference signals are located, an interval between any two adjacent subcarriers occupied by the first reference signals is K subcarriers, that is, one first reference signal is set for every K subcarriers. K is an integer greater than or equal to 1. In this way, resource overheads of the JD-RSs can be reduced.

In a possible implementation, a subcarrier that carries the first reference signal and that is in the last M symbols in the first time unit is the same as a subcarrier that carries the first reference signal and that is in the first N symbols in the second time unit. This can avoid that a phase jump determining result is affected because a frequency of the subcarrier that carries the first reference signal and that is in the first time unit is different from a frequency of the subcarrier that carries the first reference signal and that is in the second time unit, thereby improving accuracy of determining whether there is a phase jump.

According to a second aspect, an embodiment of this application further provides a reference signal sending method. The reference signal sending method may include:

receiving configuration information of a first reference signal from a network device; and sending, based on the configuration information, uplink signals to the network device in at least two time units in a frequency hopping manner, where the uplink signals each include uplink data and the first reference signal, and the at least two time units include a first time unit, a second time unit, a third time unit, and a fourth time unit that are consecutive, where a frequency domain resource occupied by the uplink signal in the first time unit is not exactly the same as a frequency domain resource occupied by the uplink signal in the second time unit; the frequency domain resource occupied by the uplink signal in the first time unit is the same as a frequency domain resource occupied by the uplink signal in the third time unit; the frequency domain resource occupied by the uplink signal in the second time unit is the same as a frequency domain resource occupied by the uplink signal in the fourth time unit; the first reference signals are carried on the last M symbols in symbols that are in the first time unit and the second time unit and on which the uplink signals are located; the first reference signals are further carried on the first N symbols in symbols that are in the third time unit and the fourth time unit and on which the uplink signals are located; a subcarrier that carries the first reference signal and that is in the last M symbols in the first time unit is the same as a subcarrier that carries the first reference signal and that is in the first N symbols in the third time unit; a subcarrier that carries the first reference signal and that is in the last M symbols in the second time unit is the same as a subcarrier that carries the first reference signal and that is in the first N symbols in the fourth time unit; and N and M are integers greater than or equal to 1.

The method provided in this embodiment may be executed by a terminal, or may be implemented by a chip in the terminal, for example, a baseband processor, or may be jointly implemented by a baseband processor and a radio frequency unit. When the foregoing method is implemented by the baseband processor, the receiving action may be understood as an operation of decoding a received signal to obtain configuration information, or may be understood as an operation of reading a signal input by the radio frequency unit. The action of sending the uplink signals may be understood as an action of generating uplink signals and outputting the uplink signals.

When the foregoing method is jointly implemented by the baseband processor and the radio frequency unit, the receiving action may be understood as an operation that the radio frequency unit receives a signal and performs down-conversion processing on the received signal, and the baseband processor decodes a signal output by a radio frequency signal to obtain configuration information; and the action of sending the uplink signals may be understood as an action that the baseband processor generates uplink signals and outputs the uplink signals, and the radio frequency unit sends the uplink signals.

It can be learned that, in this embodiment of this application, the subcarrier that carries the first reference signal and that is in the last M symbols in the first time unit is the same as the subcarrier that carries the first reference signal and that is in the first N symbols in the third time unit. This can avoid that a phase jump determining result is affected because a frequency of the subcarrier that carries the first reference signal and that is in the first time unit is different from a frequency of the subcarrier that carries the first reference signal and that is in the third time unit, thereby improving accuracy of determining whether there is a phase jump. Similarly, the subcarrier that carries the first reference signal and that is in the last M symbols in the second time unit is the same as the subcarrier that carries the first reference signal and that is in the first N symbols in the fourth time unit. This can avoid that a phase jump determining result is affected because a frequency of the subcarrier that carries the first reference signal and that is in the second time unit is different from a frequency of the subcarrier that carries the first reference signal and that is in the fourth time unit, thereby improving accuracy of determining whether there is a phase jump.

In a possible implementation, a time unit is a hop in a slot.

In a possible implementation, a time unit is a slot.

In a possible implementation, the configuration information includes at least one of sequence indication information, time domain resource indication information, and frequency domain resource indication information.

The sequence indication information is used to indicate a sequence corresponding to the first reference signal, the time domain resource indication information is used to indicate a symbol that carries the first reference signal, and the frequency domain resource indication information is used to indicate a subcarrier that carries the first reference signal.

According to a third aspect, an embodiment of this application further provides a reference signal receiving method. The reference signal receiving method may include:

sending configuration information of a first reference signal; and receiving uplink signals from a terminal in at least two time units, where the uplink signals each include uplink data and the first reference signal that corresponds to the configuration information, the at least two time units include a first time unit and a second time unit, the first time unit is adjacent to and located before the second time unit, the first reference signal is carried on the first N symbols in symbols that are in the second time unit and on which the uplink signal is located, the first reference signal is carried on the last M symbols in symbols that are in the first time unit and on which the uplink signal is located, and N and M are integers greater than or equal to 1.

The method provided in this embodiment may be executed by a network device, or may be implemented by a chip in the network device, for example, a baseband processor, or may be jointly implemented by a baseband processor and a radio frequency unit. When the foregoing method is implemented by the baseband processor, the receiving action may be understood as an operation of decoding a received signal to obtain configuration information, or may be understood as an operation of reading a signal input by the radio frequency unit. The action of sending the uplink signals may be understood as an action of generating uplink signals and outputting the uplink signals.

When the foregoing method is jointly implemented by the baseband processor and the radio frequency unit, the receiving action may be understood as an operation that the radio frequency unit receives a signal and performs down-conversion processing on the received signal, and the baseband processor decodes a signal output by a radio frequency signal to obtain configuration information; and the action of sending the uplink signals may be understood as an action that the baseband processor generates uplink signals and outputs the uplink signals, and the radio frequency unit sends the uplink signals.

In a possible implementation, the first reference signal is carried on the first N symbols in symbols that are in each of the at least two time units and on which the uplink signal is located, and the first reference signal is carried on the last M symbols in the symbols that are in each of the at least two time units and on which the uplink signal is located.

In a possible implementation, the at least two time units include L time units, and L is an integer greater than 1.

The first reference signal is carried on the first N symbols in symbols that are in each of the last L−1 time units and on which the uplink signal is located, and the first reference signal is not carried in the $1^{st}$ time unit in the L time units; and the first reference signal is carried on the last M symbols in symbols that are in each of the first L−1 time units and on which the uplink signal is located, and the first reference signal is not carried in the last time unit in the L time units.

In a possible implementation, in symbols on which the first reference signals are located, an interval between any two adjacent subcarriers occupied by the first reference signals is K subcarriers, and K is an integer greater than or equal to 1.

In a possible implementation, a subcarrier that carries the first reference signal and that is in the last M symbols in the first time unit is the same as a subcarrier that carries the first reference signal and that is in the first N symbols in the second time unit.

According to a fourth aspect, an embodiment of this application further provides a reference signal receiving method. The reference signal receiving method may include:

sending configuration information of a first reference signal; and receiving, in at least two time units, uplink signals transmitted in a frequency hopping manner, where the uplink signals each include uplink data and the first reference signal that corresponds to the configuration information, and the at least two time units include a first time unit, a second time unit, a third time unit, and a fourth time unit that are consecutive, where a frequency domain resource occupied by the uplink signal in the first time unit is not exactly the same as a frequency domain resource occupied by the uplink signal in the second time unit; the frequency domain resource occupied by the uplink signal in the first time unit is the same as a frequency domain resource occupied by the uplink signal in the third time unit; the frequency domain resource occupied by the uplink signal in the second time unit is the same as a frequency domain resource occupied by the uplink signal in the fourth time unit; the first reference signals are carried on the last M symbols in symbols that are in the first time unit and the second time unit and on which the uplink signals are located; the first reference signals are further carried on the first N symbols in symbols that are in the third time unit and the fourth time unit and on which the uplink signals are located; a subcarrier that carries the first reference signal and that is in the last M symbols in the first time unit is the same as a subcarrier that carries the first reference signal and that is in the first N symbols in the third time unit; a subcarrier that carries the first reference signal and that is in the last M symbols in the second time unit is the same as a subcarrier that carries the first reference signal and that is in the first N symbols in the fourth time unit; and N and M are integers greater than or equal to 1.

The method provided in this embodiment may be executed by a network device, or may be implemented by a chip in the network device, for example, a baseband processor, or may be jointly implemented by a baseband processor and a radio frequency unit. When the foregoing method is implemented by the baseband processor, the receiving action may be understood as an operation of decoding a received signal to obtain configuration information, or may be understood as an operation of reading a signal input by the radio frequency unit. The action of sending the uplink signals may be understood as an action of generating uplink signals and outputting the uplink signals.

When the foregoing method is jointly implemented by the baseband processor and the radio frequency unit, the receiving action may be understood as an operation that the radio frequency unit receives a signal and performs down-conversion processing on the received signal, and the baseband processor decodes a signal output by a radio frequency signal to obtain configuration information; and the action of sending the uplink signals may be understood as an action that the baseband processor generates uplink signals and outputs the uplink signals, and the radio frequency unit sends the uplink signals.

In a possible implementation, a time unit is a hop in a slot.

In a possible implementation, a time unit is a slot.

In a possible implementation, the configuration information includes at least one of sequence indication information, time domain resource indication information, and frequency domain resource indication information.

The sequence indication information is used to indicate a sequence corresponding to the first reference signal, the time domain resource indication information is used to indicate a symbol that carries the first reference signal, and the frequency domain resource indication information is used to indicate a subcarrier that carries the first reference signal.

In a possible implementation, the reference signal receiving method may include:

performing joint channel estimation based on the first reference signals.

According to a fifth aspect, an embodiment of this application further provides a reference signal sending apparatus. The reference signal sending apparatus may include:

a receiving unit, configured to receive configuration information of a first reference signal from a network device; and a sending unit, configured to send, based on the configuration information, uplink signals to the network device in at least two time units, where the uplink signals each include uplink data and the first reference signal, the at least two time units include a first time unit and a second time unit, the first time unit is adjacent to and located before the second time unit, the first reference signal is carried on the first N symbols in symbols that are in the second time unit and on which the uplink signal is located, the first reference signal is carried on the last M symbols in symbols that are in the first time unit and on which the uplink signal is located, and N and M are integers greater than or equal to 1.

The apparatus provided in this embodiment may be a terminal, or may be a chip in the terminal, for example, a baseband processor, or may be jointly implemented by a baseband processor and a radio frequency unit. When the foregoing apparatus is the baseband processor, the receiving action may be understood as an operation of decoding a received signal to obtain configuration information, or may be understood as an operation of reading a signal input by the radio frequency unit. The action of sending the uplink signals may be understood as an action of generating uplink signals and outputting the uplink signals.

When the foregoing apparatus is the baseband processor and the radio frequency unit, the receiving action may be understood as an operation that the radio frequency unit receives a signal and performs down-conversion processing on the received signal, and the baseband processor decodes a signal output by a radio frequency signal to obtain configuration information; and the action of sending the uplink signals may be understood as an action that the baseband processor generates uplink signals and outputs the uplink signals, and the radio frequency unit sends the uplink signals.

In a possible implementation, the first reference signal is carried on the first N symbols in symbols that are in each of the at least two time units and on which the uplink signal is located, and the first reference signal is carried on the last M symbols in the symbols that are in each of the at least two time units and on which the uplink signal is located.

In a possible implementation, the at least two time units include L time units, and L is an integer greater than 1.

The first reference signal is carried on the first N symbols in symbols that are in each of the last L−1 time units and on which the uplink signal is located, and the first reference signal is not carried in the $1^{st}$ time unit in the L time units; and the first reference signal is carried on the last M symbols in symbols that are in each of the first L−1 time units and on which the uplink signal is located, and the first reference signal is not carried in the last time unit in the L time units.

In a possible implementation, in symbols on which the first reference signals are located, an interval between any two adjacent subcarriers occupied by the first reference signals is K subcarriers, and K is an integer greater than or equal to 1.

In a possible implementation, a subcarrier that carries the first reference signal and that is in the last M symbols in the first time unit is the same as a subcarrier that carries the first reference signal and that is in the first N symbols in the second time unit.

According to a sixth aspect, an embodiment of this application further provides a reference signal sending apparatus. The reference signal sending apparatus may include:

a receiving unit, configured to receive configuration information of a first reference signal from a network device; and a sending unit, configured to send, based on the configuration information, uplink signals to the network device in at least two time units in a frequency hopping manner, where the uplink signals each include uplink data and the first reference signal, and the at least two time units include a first time unit, a second time unit, a third time unit, and a fourth time unit that are consecutive, where a frequency domain resource occupied by the uplink signal in the first time unit is not exactly the same as a frequency domain resource occupied by the uplink signal in the second time unit; the frequency domain resource occupied by the uplink signal in the first time unit is the same as a frequency domain resource occupied by the uplink signal in the third time unit; the frequency domain resource occupied by the uplink signal in the second time unit is the same as a frequency domain resource occupied by the uplink signal in the fourth time unit; the first reference signals are carried on the last M symbols in symbols that are in the first time unit and the second time unit and on which the uplink signals are located; the first reference signals are further carried on the first N symbols in symbols that are in the third time unit and the fourth time unit and on which the uplink signals are located; a subcarrier that carries the first reference signal and that is in the last M symbols in the first time unit is the same as a subcarrier that carries the first reference signal and that is in the first N symbols in the third time unit; a subcarrier that carries the first reference signal and that is in the last M symbols in the second time unit is the same as a subcarrier that carries the first reference signal and that is in the first N symbols in the fourth time unit; and N and M are integers greater than or equal to 1.

The apparatus provided in this embodiment may be a terminal, or may be a chip in the terminal, for example, a baseband processor, or may be jointly implemented by a baseband processor and a radio frequency unit. When the foregoing apparatus is the baseband processor, the receiving action may be understood as an operation of decoding a received signal to obtain configuration information, or may be understood as an operation of reading a signal input by the radio frequency unit. The action of sending the uplink signals may be understood as an action of generating uplink signals and outputting the uplink signals.

When the foregoing apparatus is the baseband processor and the radio frequency unit, the receiving action may be understood as an operation that the radio frequency unit receives a signal and performs down-conversion processing on the received signal, and the baseband processor decodes a signal output by a radio frequency signal to obtain configuration information; and the action of sending the uplink signals may be understood as an action that the baseband processor generates uplink signals and outputs the uplink signals, and the radio frequency unit sends the uplink signals.

In a possible implementation, a time unit is a hop in a slot.

In a possible implementation, a time unit is a slot.

In a possible implementation, the configuration information includes at least one of sequence indication information, time domain resource indication information, and frequency domain resource indication information.

The sequence indication information is used to indicate a sequence corresponding to the first reference signal, the time domain resource indication information is used to indicate a symbol that carries the first reference signal, and the frequency domain resource indication information is used to indicate a subcarrier that carries the first reference signal.

According to a seventh aspect, an embodiment of this application further provides a reference signal receiving apparatus. The reference signal receiving apparatus may include:
- a sending unit, configured to send configuration information of a first reference signal; and
- a receiving unit, configured to receive uplink signals from a terminal in at least two time units, where the uplink signals each include uplink data and the first reference signal that corresponds to the configuration information, the at least two time units include a first time unit and a second time unit, the first time unit is adjacent to and located before the second time unit, the first reference signal is carried on the first N symbols in symbols that are in the second time unit and on which the uplink signal is located, the first reference signal is carried on the last M symbols in symbols that are in the first time unit and on which the uplink signal is located, and N and M are integers greater than or equal to 1.

The apparatus provided in this embodiment may be a network device, or may be a chip in the network device, for example, a baseband processor, or may be jointly implemented by a baseband processor and a radio frequency unit. When the foregoing apparatus is the baseband processor, the receiving action may be understood as an operation of decoding a received signal to obtain configuration information, or may be understood as an operation of reading a signal input by the radio frequency unit. The action of sending the uplink signals may be understood as an action of generating uplink signals and outputting the uplink signals.

When the foregoing apparatus is the baseband processor and the radio frequency unit, the receiving action may be understood as an operation that the radio frequency unit receives a signal and performs down-conversion processing on the received signal, and the baseband processor decodes a signal output by a radio frequency signal to obtain configuration information; and the action of sending the uplink signals may be understood as an action that the baseband processor generates uplink signals and outputs the uplink signals, and the radio frequency unit sends the uplink signals.

In a possible implementation, the first reference signal is carried on the first N symbols in symbols that are in each of the at least two time units and on which the uplink signal is located, and the first reference signal is carried on the last M symbols in the symbols that are in each of the at least two time units and on which the uplink signal is located.

In a possible implementation, the at least two time units include L time units, and L is an integer greater than 1.

The first reference signal is carried on the first N symbols in symbols that are in each of the last L−1 time units and on which the uplink signal is located, and the first reference signal is not carried in the 1$^{st}$ time unit in the L time units; and the first reference signal is carried on the last M symbols in symbols that are in each of the first L−1 time units and on which the uplink signal is located, and the first reference signal is not carried in the last time unit in the L time units.

In a possible implementation, in symbols on which the first reference signals are located, an interval between any two adjacent subcarriers occupied by the first reference signals is K subcarriers, and K is an integer greater than or equal to 1.

In a possible implementation, a subcarrier that carries the first reference signal and that is in the last M symbols in the first time unit is the same as a subcarrier that carries the first reference signal and that is in the first N symbols in the second time unit.

According to an eighth aspect, an embodiment of this application further provides a reference signal receiving apparatus. The reference signal receiving apparatus may include:
- a sending unit, configured to send configuration information of a first reference signal; and
- a receiving unit, configured to receive, in at least two time units, uplink signals transmitted in a frequency hopping manner, where the uplink signals each include uplink data and the first reference signal that corresponds to the configuration information, and the at least two time units include a first time unit, a second time unit, a third time unit, and a fourth time unit that are consecutive, where a frequency domain resource occupied by the uplink signal in the first time unit is not exactly the same as a frequency domain resource occupied by the uplink signal in the second time unit; the frequency domain resource occupied by the uplink signal in the first time unit is the same as a frequency domain resource occupied by the uplink signal in the third time unit; the frequency domain resource occupied by the uplink signal in the second time unit is the same as a frequency domain resource occupied by the uplink signal in the fourth time unit; the first reference signals are carried on the last M symbols in symbols that are in the first time unit and the second time unit and on which the uplink signals are located; the first reference signals are further carried on the first N symbols in symbols that are in the third time unit and the fourth time unit and on which the uplink signals are located; a subcarrier that carries the first reference signal and that is in the last M symbols in the first time unit is the same as a subcarrier that carries the first reference signal and that is in the first N symbols in the third time unit; a subcarrier that carries the first reference signal and that is in the last M symbols in the second time unit is the same as a subcarrier that carries the first reference signal and that is in the first N symbols in the fourth time unit; and N and M are integers greater than or equal to 1.

The apparatus provided in this embodiment may be a network device, or may be a chip in the network device, for example, a baseband processor, or may be jointly implemented by a baseband processor and a radio frequency unit. When the foregoing apparatus is the baseband processor, the receiving action may be understood as an operation of decoding a received signal to obtain configuration information, or may be understood as an operation of reading a signal input by the radio frequency unit. The action of sending the uplink signals may be understood as an action of generating uplink signals and outputting the uplink signals.

When the foregoing apparatus is the baseband processor and the radio frequency unit, the receiving action may be understood as an operation that the radio frequency unit receives a signal and performs down-conversion processing on the received signal, and the baseband processor decodes a signal output by a radio frequency signal to obtain configuration information; and the action of sending the uplink signals may be understood as an action that the baseband processor generates uplink signals and outputs the uplink signals, and the radio frequency unit sends the uplink signals.

In a possible implementation, a time unit is a hop in a slot.

In a possible implementation, a time unit is a slot.

In a possible implementation, the configuration information includes at least one of sequence indication information, time domain resource indication information, and frequency domain resource indication information.

The sequence indication information is used to indicate a sequence corresponding to the first reference signal, the time domain resource indication information is used to indicate a symbol that carries the first reference signal, and the frequency domain resource indication information is used to indicate a subcarrier that carries the first reference signal.

In a possible implementation, the reference signal receiving apparatus may further include a processing unit. The processing unit is configured to perform joint channel estimation based on the first reference signals.

According to a ninth aspect, an embodiment of this application further provides a communication system. The communication system may include the reference signal sending apparatus according to any one of the possible implementations of the fifth aspect and the reference signal receiving apparatus according to any one of the possible implementations of the seventh aspect; or the communication system may include the reference signal sending apparatus according to any one of the possible implementations of the sixth aspect and the reference signal receiving apparatus according to any one of the possible implementations of the eighth aspect.

According to a tenth aspect, an embodiment of this application further provides a communication device. The communication device may include a processor and a memory.

The memory is configured to store program instructions.

The processor is configured to: read the program instructions in the memory, and perform, according to the program instructions in the memory, the reference signal sending method according to any one of the possible implementations of the first aspect, the reference signal sending method according to any one of the possible implementations of the second aspect, the reference signal receiving method according to any one of the possible implementations of the third aspect, or the reference signal receiving method according to any one of the possible implementations of the fourth aspect.

According to an eleventh aspect, an embodiment of this application further provides a readable storage medium. The readable storage medium stores a computer program. When the computer program is executed, the computer program is used to perform the reference signal sending method according to any one of the possible implementations of the first aspect, the reference signal sending method according to any one of the possible implementations of the second aspect, the reference signal receiving method according to any one of the possible implementations of the third aspect, or the reference signal receiving method according to any one of the possible implementations of the fourth aspect.

According to a twelfth aspect, an embodiment of this application further provides a chip. The chip stores a computer program. When the computer program is executed by a processor, the reference signal sending method according to any one of the possible implementations of the first aspect, the reference signal sending method according to any one of the possible implementations of the second aspect, the reference signal receiving method according to any one of the possible implementations of the third aspect, or the reference signal receiving method according to any one of the possible implementations of the fourth aspect is performed.

Embodiments of this application provide a reference signal sending method, a reference signal receiving method, an apparatus, and a system. The terminal receives the configuration information of the first reference signal from the network device; and sends, based on the configuration information, the uplink signals to the network device in the at least two time units, where the uplink signals each include the uplink data and the first reference signal. In the two adjacent time units, the first reference signal is carried on the last M symbols in the symbols that are in the previous time unit and on which the uplink signal is located, and the first reference signal is carried on the first N symbols in the symbols that are in the subsequent time unit and on which the uplink signal is located. In this way, there is a small time interval between the first reference signal in the previous time unit and the first reference signal in the subsequent time unit. This can minimize the phase change caused by the channel change, and improve the probability of correctly determining, by the network device, whether there is a phase jump between different time units, thereby improving the accuracy of determining whether cross-time-unit joint channel estimation can be performed across time units.

DESCRIPTION OF EMBODIMENTS

Embodiments of this application are applied to a communication system, for example, a public land mobile network (PLMN) system, a 5th generation (5G) communication system, or another system that may emerge in the future. The following explains some terms in this application, to help a person skilled in the art have a better understanding. It should be noted that, when solutions in embodiments of this application are applied to the 5G system or the another system that may emerge in the future, names of a network device and a terminal may change, but this does not affect implementation of the solutions in embodiments of this application.

It may be understood that a reference signal sending method provided in embodiments of this application may be applied to a scenario in which uplink data is repeatedly sent, or may be applied to another scenario, for example, another uplink scenario such as a scenario in which a physical uplink control channel (PUCCH) is sent, or a downlink transmission scenario. In addition, it should be further noted that the reference signal sending method provided in embodiments of this application may be applied to a scenario in which same data (having a same redundancy version or different redundancy versions) is repeatedly sent, or may be applied to a scenario in which different data is separately sent by using different time domain resources.

Figure 1:
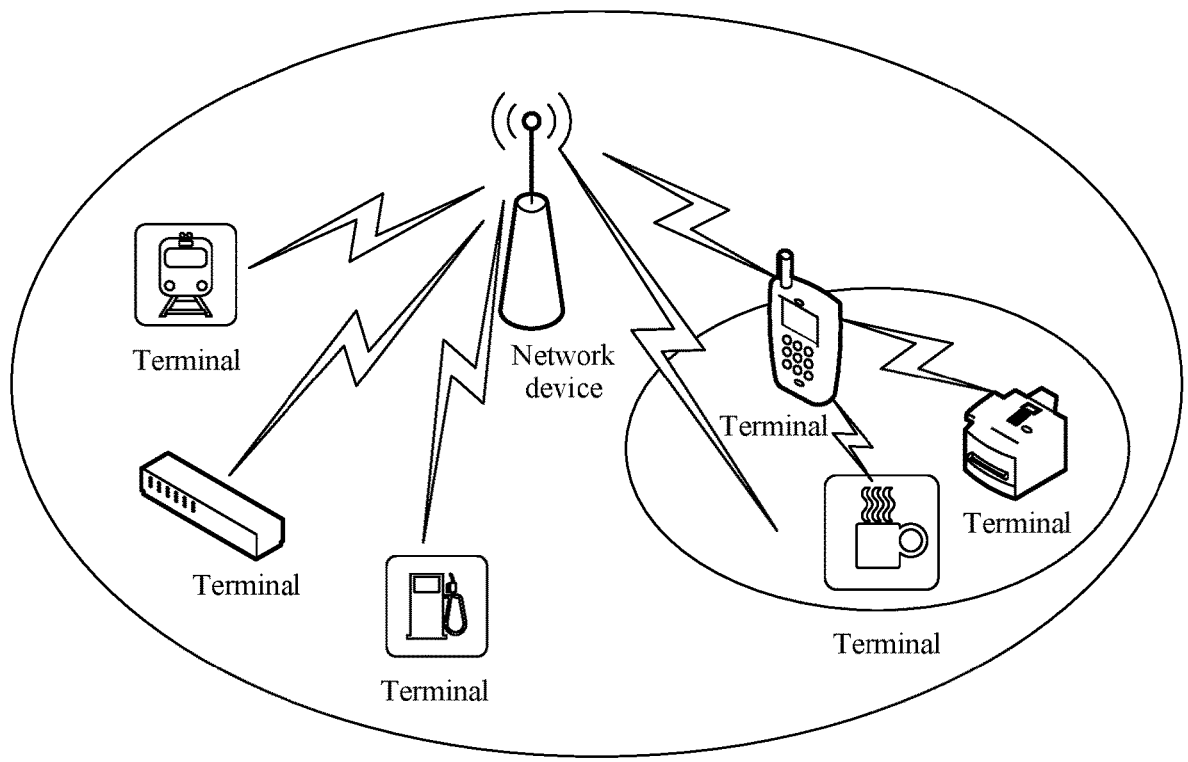
FIG. 1 is a schematic diagram of an application scenario according to an embodiment of this application.

FIG. 1 is a schematic diagram of an application scenario according to an embodiment of this application. Refer to FIG. 1. An application system shown in FIG. 1 may include one network device and at least one terminal, and each terminal may communicate with the network device by using a radio signal. In a conventional technology, the terminal sends, to the network device in at least two time units, uplink signals that each include a DMRS. In this case, if the at least two time units are inconsecutive in time domain, there may be a phase jump between the inconsecutive time units, which may also be understood as that there may be a phase jump between the uplink signals carried in the inconsecutive time units; or if the at least two time units are consecutive in time domain, but symbols that are in the two consecutive time units and on which the DMRSs are located are inconsecutive, there may be a phase jump between the consecutive time units, which may also be understood as that there may be a phase jump between the uplink signals carried in the consecutive time units. Because the phase jump is random and uncontrollable, a phase difference between the DMRSs includes not only a phase rotation caused by a channel, but also an unknown phase rotation. Consequently, when there is a phase jump, cross-time-segment joint channel estimation cannot be performed. To resolve this problem, embodiments of this application provide a reference signal sending method. A terminal receives configuration information of a first reference signal from a network device; and sends, based on the configuration information, uplink signals to the network device in at least two time units, where the uplink signals each include uplink data and the first reference signal. During uplink signal sending, in two adjacent time units, the first reference signal is carried on the last M symbols in symbols that are in a previous time unit (first time unit) and on which the uplink signal is located, and the first reference signal is carried on the first N symbols in symbols that are in a subsequent time unit (second time unit) and on which the uplink signal is located. In this way, there is a small time interval between the first reference signal in the previous time unit and the first reference signal in the subsequent time unit. This can minimize a phase change caused by a channel change, and improve a probability of correctly determining, by the network device, whether there is a phase jump between different time units, thereby improving accuracy of determining whether cross-time-unit joint channel estimation can be performed across time units. It should be noted that, in embodiments of this application, for ease of description, the at least two time units are referred to as transmission duration. The following continues to use this example for description.

The first reference signal may be a DMRS, where the DMRS is used to demodulate data, or may be a reference signal other than a DMRS, for example, a jumping detection reference signal (JD-RS). Specifically, the first reference signal may be configured based on an actual requirement. It may be understood that, when the first reference signal is the JD-RS, the last M symbols that are used to carry the JD-RS and that are in the symbols that are in the first time unit and on which the uplink signal is located and the first N symbols that are used to carry the JD-RS and that are in the symbols that are in the second time unit and on which the uplink signal is located are jointly determined based on symbols on which DMRS signals are currently located. The following provides detailed descriptions.

It may be understood that, in embodiments of this application, a time unit may be a slot, or may be a hop in a slot. Specifically, the time unit may be configured based on an actual requirement. It should be particularly noted that, in embodiments of this application, the last M symbols in the first time unit that are used to carry the first reference signal are not the last M symbols in all symbols included in the entire first time unit, but are the last M symbols in symbols that are used to carry the uplink signal and that are in all the symbols included in the entire first time unit. For example, the time unit is a slot, and the entire slot includes 14 symbols that can be used to carry the first reference signal. However, when the uplink data is transmitted, the uplink signal is carried on only 10 symbols in the middle of the 14 symbols. In this case, the last M symbols in the slot that are used to carry the first reference signal are not the last M symbols in the 14 symbols included in the entire slot, but are the last M symbols in the 10 symbols in the middle of the 14 symbols. Similarly, the first N symbols in the second time unit that are used to carry the first reference signal are not the first N symbols in all symbols included in the entire second time unit, but are the first N symbols in symbols that are used to carry the uplink signal and that are in all the symbols included in the entire second time unit. Both M and N are integers greater than 1, and M may or may not be equal to N.

It may be understood that, when M and N are determined, if both M and N are equal to 1, it indicates that the first reference signals occupy few symbols in the first time unit and the second time unit. This can not only improve the probability of correctly determining, by the network device, whether there is a phase jump, but also reduce resource overheads occupied by first reference resources. Compared with a case in which both M and N are equal to 1, when both M and N are greater than 1, although resource overheads occupied by the first reference resources are increased, the network device may be assisted in determining a change speed of a channel between symbols. For example, when M=2, the terminal sends the first reference signals on the last two symbols in symbols in a time unit that carry the uplink signal. If the network device finds that there is a small phase change in the first reference signals on the two symbols, the network device may determine that there is a small possibility that a channel changes sharply between the two symbols. Therefore, the network device may determine that there is a large possibility that there is a phase change in the first reference signals in the two time units. This further improves the probability of correctly determining, by the network device, whether there is a phase jump. Specific values of M and N may be configured by the network device for a terminal device, or may be determined in a predefined manner.

(1) The terminal is also referred to as a terminal device or user equipment, and is a device that provides voice and/or data connectivity for a user, for example, a handheld device or a vehicle-mounted device that has a wireless connection function. For example, common terminal devices include a mobile phone, a tablet computer, a notebook computer, a palmtop computer, a mobile internet device (MID), and a wearable device. For example, wearable devices include a smart watch, a smart band, and a pedometer.

(2) In embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists, where A and B may be singular or plural. In the descriptions of this application, the character "/" usually indicates an "or" relationship between associated objects.

It should be noted that, when an uplink signal sending method is performed, only an example in which execution bodies are a network device and a terminal is used for description in embodiments of this application, but this does not mean that embodiments of this application are limited thereto. It may be understood that, when the execution body is the network device, the uplink signal sending method may be implemented by the network device, or may be implemented by a chip in the network device, for example, a baseband processor, or may be jointly implemented by a baseband processor and a radio frequency unit; or when the execution body is the terminal, the uplink signal sending method may be implemented by the terminal, or may be implemented by a chip in the terminal, for example, a baseband processor, or may be jointly implemented by a baseband processor and a radio frequency unit.

With reference to the uplink signal sending method provided in embodiments of this application, it can be learned that, when the terminal sends the uplink signals to the network device in the two adjacent time units: the first time unit and the second time unit, in the two adjacent time units, the first reference signal is carried on the last M symbols in the symbols that are in the previous time unit and on which the uplink signal is located, and the first reference signal is carried on the first N symbols in the symbols that are in the subsequent time unit and on which the uplink signal is located. In this way, there is a small time interval between the first reference signal in the previous time unit and the first reference signal in the subsequent time unit. This can minimize the phase change caused by the channel change, and improve the probability of correctly determining, by the network device, whether there is a phase jump, thereby improving the accuracy of determining whether cross-time-unit joint channel estimation can be performed across time units. When the terminal sends the uplink signals to the network device in the two adjacent time units: the first time unit and the second time unit, there are usually two different sending scenarios. In a possible sending scenario, the terminal sends the uplink signals to the network device in a non-frequency-hopping manner. In the non-frequency-hopping sending scenario, a time unit is a slot. In another possible sending scenario, the terminal sends the uplink signals to the network device in a frequency hopping manner. The frequency hopping manner further includes an inter-slot frequency hopping manner and an intra-slot frequency hopping manner. In the frequency hopping sending scenario, a time unit is a slot or a hop in a slot. With reference to the two different sending scenarios, the following separately describes in detail the reference signal sending method provided in embodiments of this application.

Figure 2:
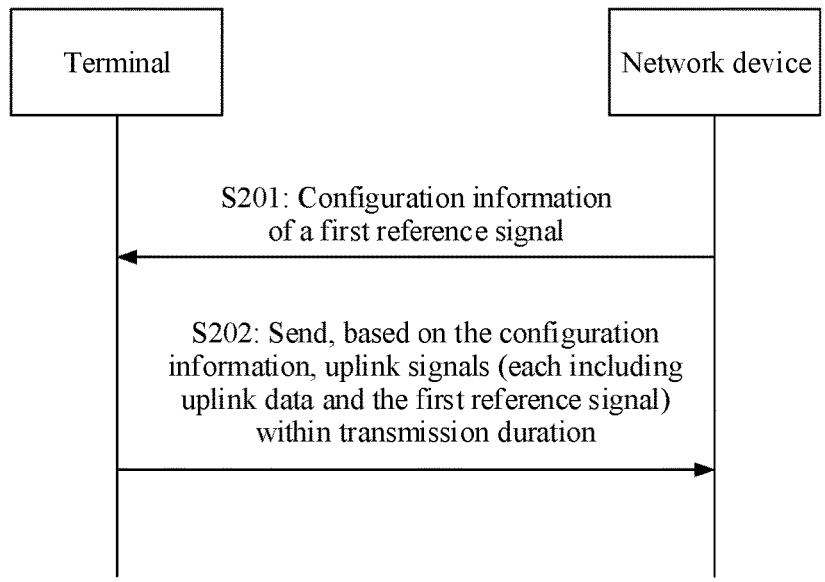
FIG. 2 is a schematic flowchart of a reference signal sending method according to an embodiment of this application.

In a possible sending scenario, the terminal sends the uplink signals to the network device in the non-frequency-hopping manner. For example, the first reference signal is a DMRS. FIG. 2 is a schematic flowchart of a reference signal sending method according to an embodiment of this application. The reference signal sending method may include the following steps.

S201: A network device sends configuration information of a first reference signal to a terminal.

Optionally, the configuration information may include at least one of sequence indication information, time domain resource indication information, and frequency domain resource indication information. The sequence indication information is used to indicate a sequence corresponding to the first reference signal, the time domain resource indication information is used to indicate a symbol that carries the first reference signal, and the frequency domain resource indication information is used to indicate a subcarrier that carries the first reference signal.

After receiving the configuration information, of the first reference signal, sent by the network device, the terminal may determine the first reference signal based on the configuration information of the first reference signal. In this way, the terminal may send, to the network device within transmission duration, uplink signals that each include the first reference signal, that is, perform the following S202.

S202: The terminal sends, based on the configuration information, the uplink signals to the network device within the transmission duration.

Figure 3:
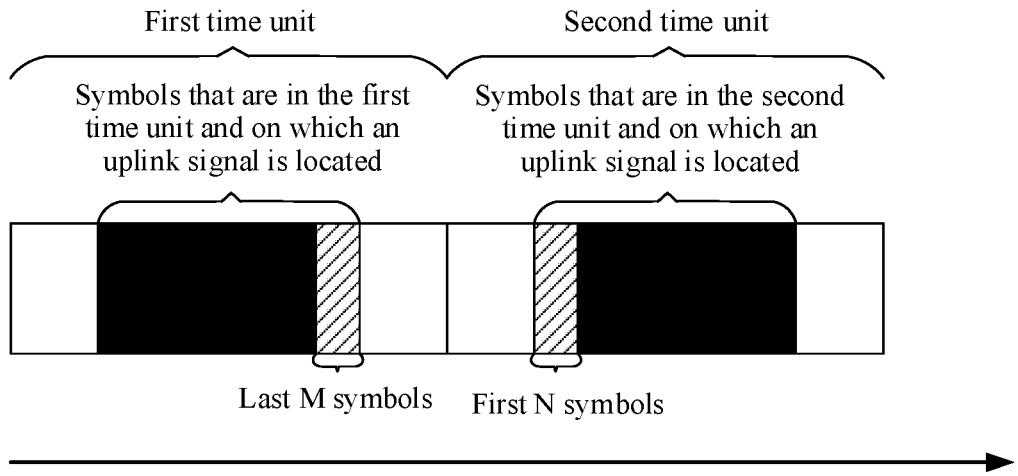
FIG. 3 is a schematic diagram of two time units that carry first reference signals according to an embodiment of this application.

The uplink signals each include uplink data and the first reference signal. The transmission duration includes a first time unit and a second time unit. The first time unit is adjacent to and located before the second time unit. The first reference signal is carried on the first N symbols in symbols that are in the second time unit and on which the uplink signal is located, and the first reference signal is carried on the last M symbols in symbols that are in the first time unit and on which the uplink signal is located. FIG. 3 is a schematic diagram of two time units that carry first reference signals according to an embodiment of this application. N and M are integers greater than or equal to 1.

It may be understood that the terminal needs to determine information in two aspects before sending, to the network device, the uplink signals that each include the uplink data and the first reference signal. According to a first aspect, the terminal needs to first generate the first reference information based on the received configuration information of the first reference signal. According to a second aspect, after generating the first reference signal and before sending the uplink signals that each include the first reference signal, the terminal needs to determine time domain resources and frequency domain resources occupied by the first reference signals. The following describes in detail how to determine the information in the two aspects.

For the first aspect, the terminal needs to first generate the first reference signal based on the received configuration information of the first reference signal. When the terminal generates the first reference signal based on the configuration information of the first reference signal, an example in which the first reference signal is a JD-RS is used. If the configuration information, of the first reference signal, received by the terminal includes the sequence indication information, the terminal needs to generate the first reference signal based on the sequence indication information. For example, when the sequence indication information is an initial phase of the JD-RS, the terminal may generate the JD-RS based on Gold sequence indication information; or when the sequence indication information is a root and a cyclic shift value of the JD-RS, the terminal may generate the JD-RS based on Zad-off Chu (ZC) sequence indication information. Certainly, the terminal may alternatively generate the JD-RS in another predefined manner. In this way, the first reference signal JD-RS is generated. Herein, a specific manner of generating the JD-RS based on the sequence indication information is not specifically limited in this embodiment of this application.

For the second aspect, the terminal determines the time domain resources and the frequency domain resources occupied by the first reference signals. In this case, with reference to FIG. 3, when the terminal determines the time domain resources occupied by the first reference signals, the time domain resources occupied by the first reference signals may be the first N symbols in the symbols that are in the second time unit and on which the uplink signal is located and the last M symbols in the symbols that are in the first time unit and on which the uplink signal is located. When the terminal determines the frequency domain resources occupied by the first reference signals, usually, because the first reference signals are used to determine whether there is a phase jump between two slots, the first reference signals do not need to be used to estimate channels on all frequencies in a transmission process. Therefore, in frequency domain, in symbols on which the first reference signals are located, an interval between any two adjacent subcarriers occupied by the first reference signals is K subcarriers, that is, one first reference signal is set for every K subcarriers. K is an integer greater than or equal to 1. In this way, resource overheads of the JD-RSs can be reduced. For example, K is equal to 6, to be specific, one first reference signal is set for every six subcarriers. Certainly, K may alternatively be an integer multiple of 6. For example, a value range of M is {6, 12, 24, 36, . . . }. An advantage is as follows: In all resource blocks (RBs) that carry the first reference signals, indexes of resource elements (REs) occupied by the first reference signals are the same. This helps the network device use a same phase jump detection method on all the RBs. An RE may be defined as a symbol in time domain or a subcarrier in frequency domain.

Figure 4:
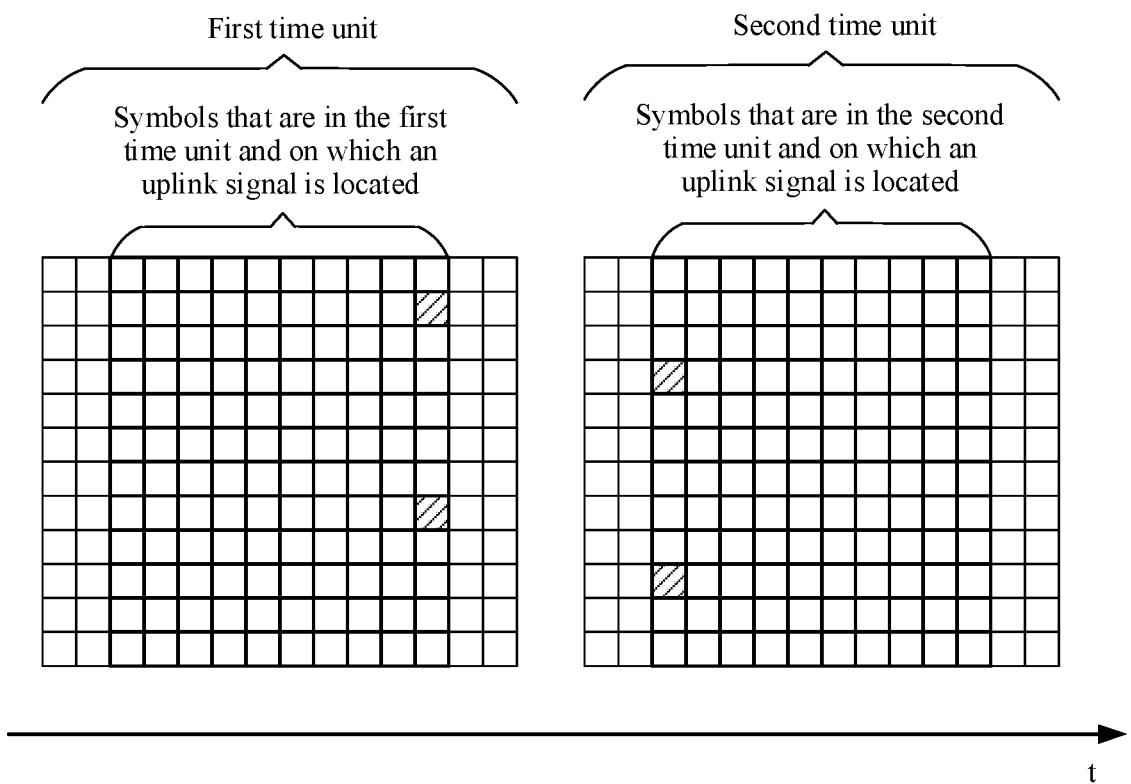
FIG. 4 is another schematic diagram of two time units that carry first reference signals according to an embodiment of this application.
Figure 5:
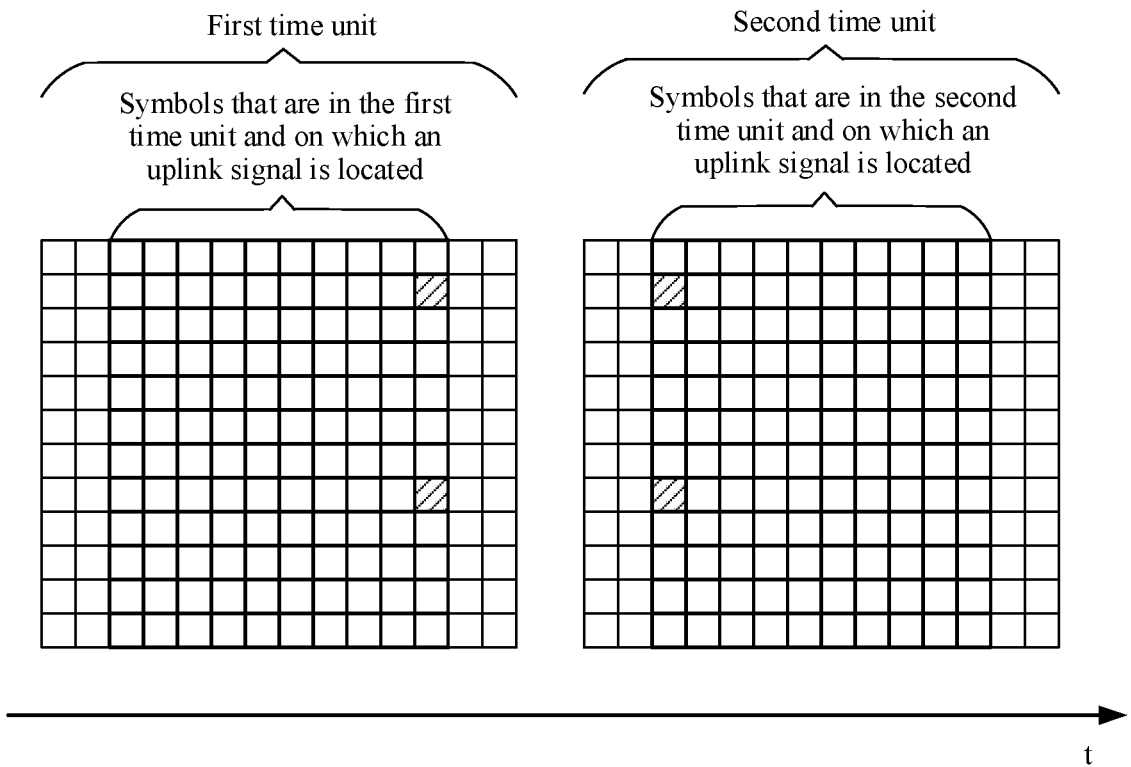
FIG. 5 is still another schematic diagram of two time units that carry first reference signals according to an embodiment of this application.

When the first reference signal is carried on the last M symbols in the symbols that are in the first time unit and on which the uplink signal is located, and the first reference signal is carried on the first N symbols in the symbols that are in the second time unit and on which the uplink signal is located, a frequency domain resource occupied by the M symbols may be different from a frequency domain resource occupied by the N symbols. For example, a subcarrier in the M symbols that carries the first reference signal may be different from a subcarrier that carries the first reference signal and that is in the first N symbols in the second time unit. FIG. 4 is another schematic diagram of two time units that carry first reference signals according to an embodiment of this application. Certainly, to avoid that a phase jump determining result is affected because a frequency of the subcarrier that carries the first reference signal and that is in the first time unit is different from a frequency of the subcarrier that carries the first reference signal and that is in the second time unit, the subcarrier that carries the first reference signal and that is in the last M symbols in the first time unit is the same as the subcarrier that carries the first reference signal and that is in the first N symbols in the second time unit. For example, FIG. 5 is still another schematic diagram of two time units that carry first reference signals according to an embodiment of this application. This can avoid that the phase jump determining result is affected because the frequency of the subcarrier that carries the first reference signal and that is in the first time unit is different from the frequency of the subcarrier that carries the first reference signal and that is in the second time unit, thereby improving accuracy of determining whether there is a phase jump.

It can be learned from the foregoing descriptions that, when the transmission duration includes two time units: the first time unit and the second time unit, it is limited in S302 that the first reference signal is carried on the last M symbols in the symbols that are in the first time unit and on which the uplink signal is located, and the first reference signal is carried on the first N symbols in the symbols that are in the second time unit and on which the uplink signal is located, as shown in FIG. 3. However, it is not further limited whether the first reference signal is carried on the first N symbols in the symbols that are in the first time unit and on which the uplink signal is located and whether the first reference signal is carried on the last M symbols in the symbols that are in the second time unit and on which the uplink signal is located. In a possible implementation, to reduce resource overheads occupied by the first reference signals in the first time unit and the second time unit, the first reference signal may be carried only on the last M symbols in the symbols that are in the first time unit and on which the uplink signal is located, and the first reference signal may be carried only on the first N symbols in the symbols that are in the second time unit and on which the uplink signal is located, but the first reference signal is not carried on the first N symbols in the symbols that are in the first time unit and on which the uplink signal is located, and the first reference signal is not carried on the last M symbols in the symbols that are in the second time unit and on which the uplink signal is located, still as shown in FIG. 3.

Figure 6:
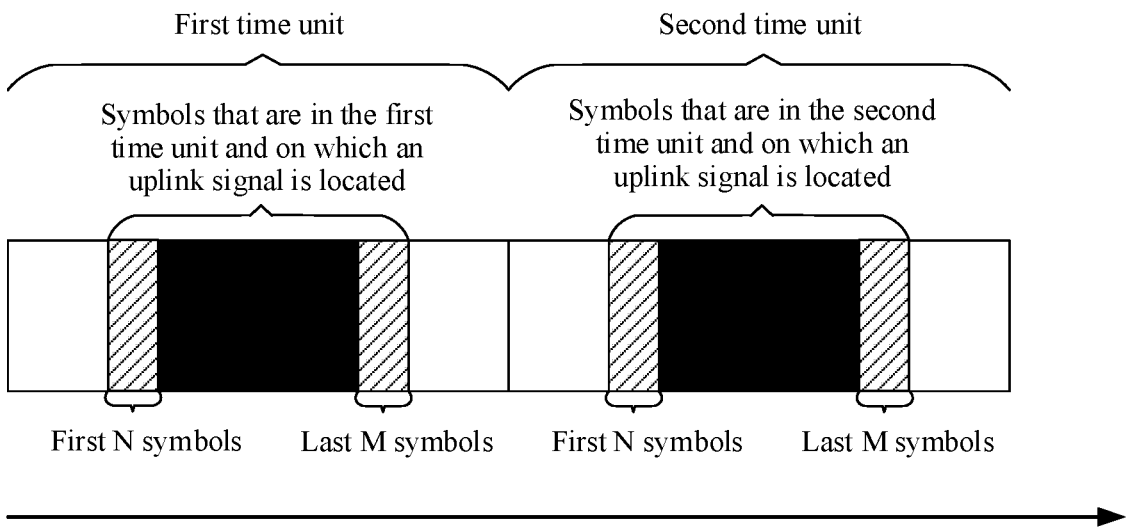
FIG. 6 is yet another schematic diagram of two time units that carry first reference signals according to an embodiment of this application.

In another possible implementation, to enable the terminal not to distinguish a sequence of the first time unit and the second time unit, the first reference signal may further be carried on the first N symbols in the symbols that are in the first time unit and on which the uplink signal is located, and the first reference signal may further be carried on the last M symbols in the symbols that are in the second time unit and on which the uplink signal is located, that is, the first reference signal is carried on the first N symbols in symbols that are in each time unit and on which the uplink signal is located, and the first reference signal is carried on the last M symbols in the symbols that are in each time unit and on which the uplink signal is located. In this way, the terminal does not need to distinguish between the first time unit and the second time unit, so that complexity of the terminal is reduced. FIG. 6 is yet another schematic diagram of two time units that carry first reference signals according to an embodiment of this application.

Figure 7:
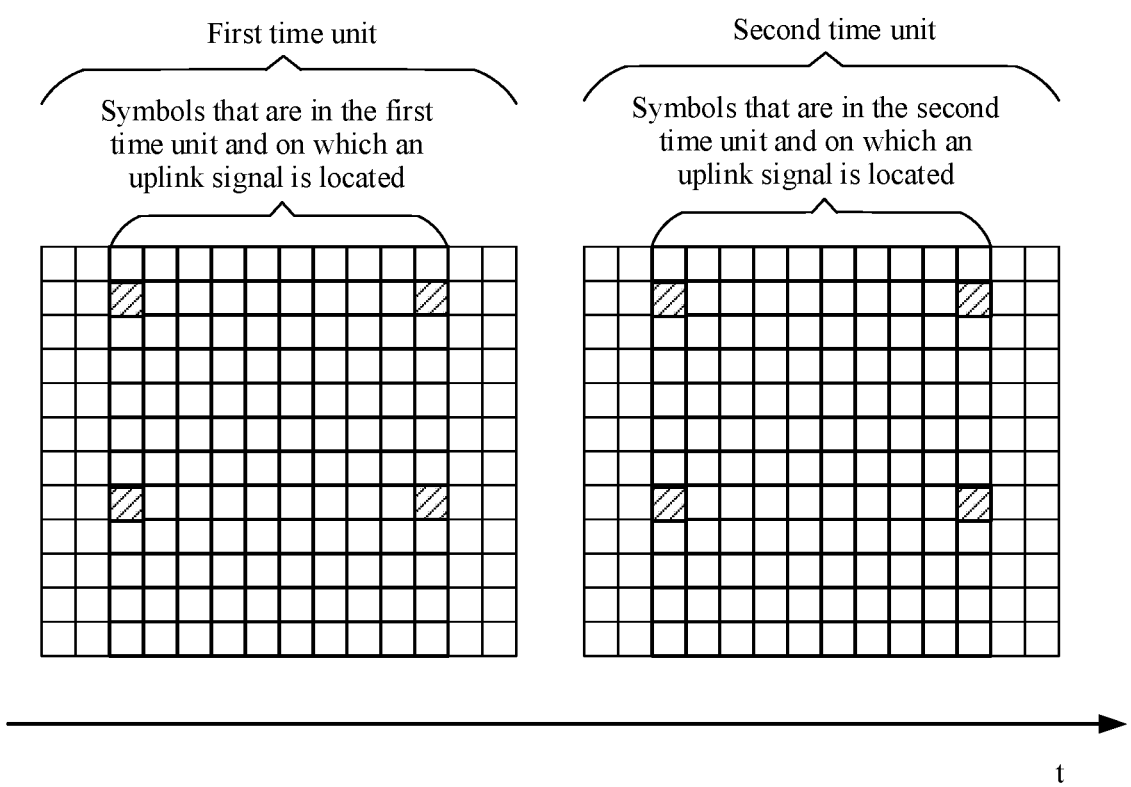
FIG. 7 is a schematic diagram of two time units that carry first reference signals according to an embodiment of this application.
Figure 8:
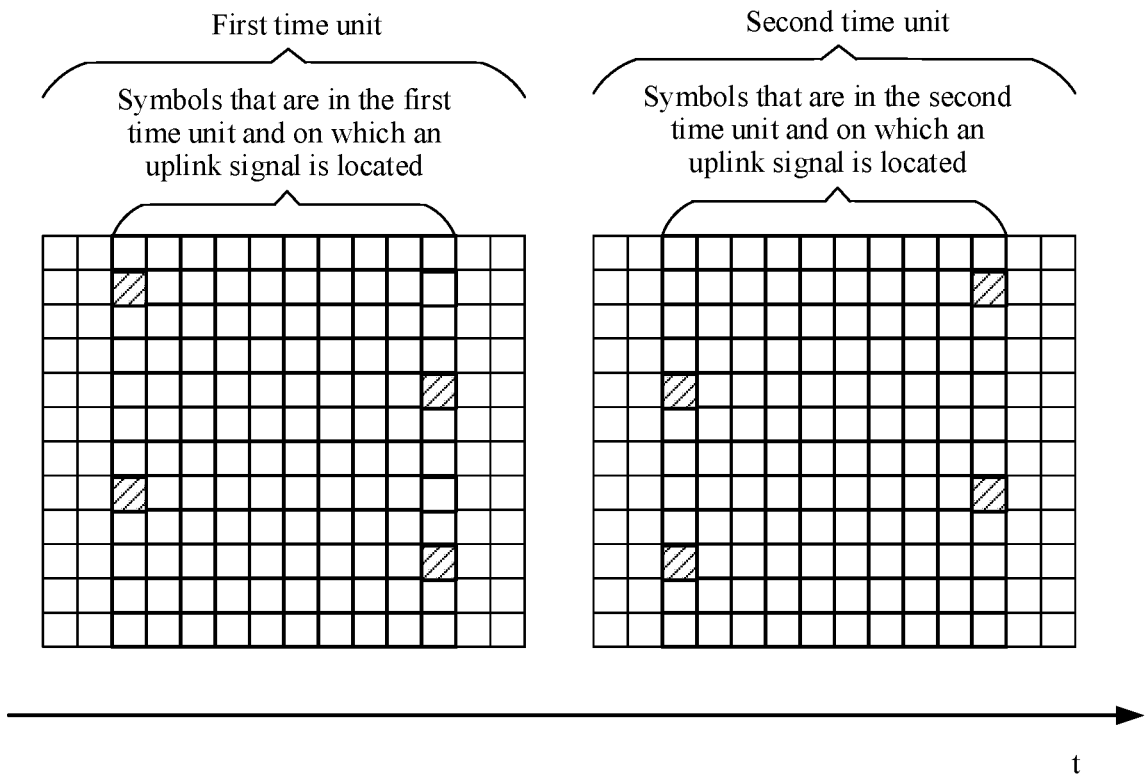
FIG. 8 is another schematic diagram of two time units that carry first reference signals according to an embodiment of this application.

With reference to FIG. 6, when the first reference signals are carried on the first N symbols and the last M symbols in the symbols that are in the first time unit and on which the uplink signal is located, a subcarrier that carries the first reference signal and that is in the first N symbols in the symbols that are in the first time unit and on which the uplink signal is located may be the same as a subcarrier that carries the first reference signal and that is in the last M symbols in the symbols that are in the first time unit and on which the uplink signal is located. For example, FIG. 7 is a schematic diagram of two time units that carry first reference signals according to an embodiment of this application. Certainly, the subcarrier that carries the first reference signal and that is in the first N symbols in the symbols that are in the first time unit and on which the uplink signal is located may alternatively be different from the subcarrier that carries the first reference signal and that is in the last M symbols in the symbols that are in the first time unit and on which the uplink signal is located. For example, FIG. 8 is another schematic diagram of two time units that carry first reference signals according to an embodiment of this application. Certainly, to avoid that a determining result is inaccurate because the subcarrier that carries the first reference signal and that is in the last M symbols in the symbols that are in the first time unit and on which the uplink signal is located is different from a subcarrier that carries the first reference signal and that is in the first N symbols in the symbols that are in the second time unit and on which the uplink signal is located, the subcarrier that carries the first reference signal and that is in the last M symbols in the symbols that are in the first time unit and on which the uplink signal is located needs to be the same as the subcarrier that carries the first reference signal and that is in the first N symbols in the symbols that are in the second time unit and on which the uplink signal is located. Similarly, when the first reference signals are carried on the first N symbols and the last M symbols in the symbols that are in the second time unit and on which the uplink signal is located, a subcarrier that carries the first reference signal and that is in the first N symbols in the symbols that are in the second time unit and on which the uplink signal is located may be the same as a subcarrier that carries the first reference signal and that is in the last M symbols in the symbols that are in the second time unit and on which the uplink signal is located, as shown in FIG. 7. Certainly, the subcarrier that carries the first reference signal and that is in the first N symbols in the symbols that are in the second time unit and on which the uplink signal is located may alternatively be different from the subcarrier that carries the first reference signal and that is in the last M symbols in the symbols that are in the second time unit and on which the uplink signal is located, as shown in FIG. 8.

Figure 9:
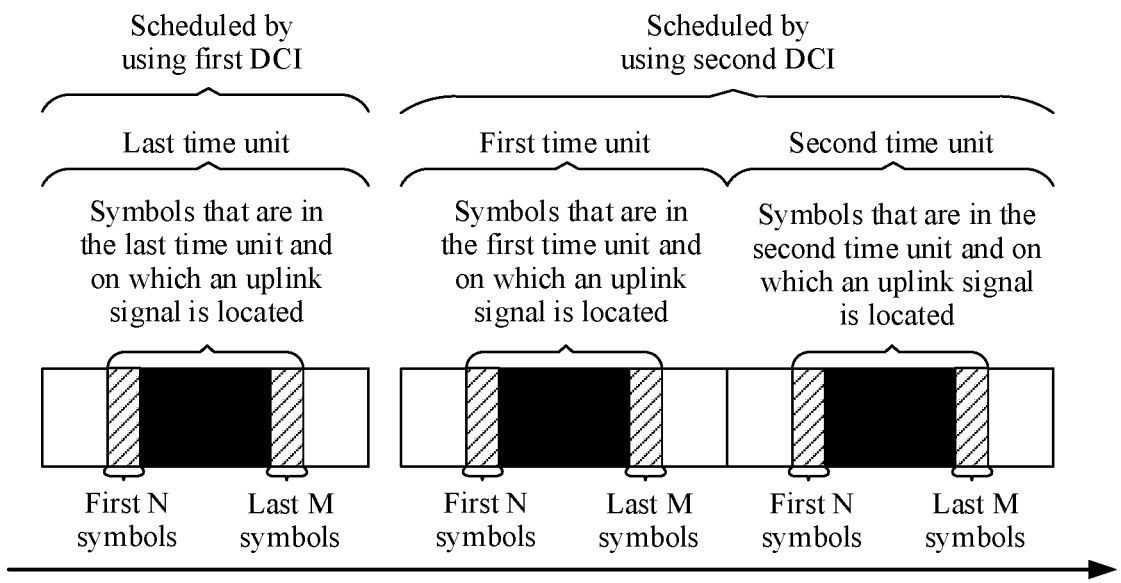
FIG. 9 is a schematic diagram of time units that carry first reference signals and that are scheduled by using two pieces of DCI according to an embodiment of this application.

It should be particularly noted that, when the first reference signals are carried on the first N symbols and the last M symbols in the symbols that are in the first time unit and on which the uplink signal is located, and the first reference signals are carried on the first N symbols and the last M symbols in the symbols that are in the second time unit and on which the uplink signal is located, with reference to FIG. 6, the uplink signal sending method provided in embodiments of this application is not limited to being applied to two time units scheduled by using a same piece of downlink control information (DCI), and may be further extended to two time units scheduled by using a plurality pieces of DCI. For example, the first time unit may be the $1^{st}$ time unit scheduled by using second DCI. Because the first reference signal is carried on the first N symbols in the symbols that are in the first time unit and on which the uplink signal is located, and the first reference signal is carried on the last M symbols in symbols on which the uplink signal is located and that are in the last time unit that is scheduled by using first DCI and that is located before the first time unit, whether there is a phase jump between uplink transmission scheduled by using the two pieces of DCI may be determined based on the first reference signal carried on the last M symbols in the symbols on which the uplink signal is located and that are in the last time unit scheduled by using the first DCI and the first reference signal carried on the first N symbols in the symbols on which the uplink signal is located and that are in the first time unit scheduled by using the second DCI, and whether channel estimation can be performed across time units is determined based on a determining result. In this way, channel estimation is performed across time units scheduled by using different DCI. FIG. 9 is a schematic diagram of time units that carry first reference signals and that are scheduled by using two pieces of DCI according to an embodiment of this application.

After generating the first reference signal, and determining the time domain resources and the frequency domain resources occupied by the first reference signals, within the transmission duration, the terminal may include the first reference signal in the last M symbols in the symbols that are in the previous time unit and on which the uplink signal is located, include the first reference signal in the first N symbols in the symbols that are in the subsequent time unit and on which the uplink signal is located, and separately send, to the network device in the first time unit and the second time unit, the uplink signals that each include the uplink data and the first reference signal. Correspondingly, the network device may perform cross-time-unit joint channel estimation based on the two first reference signals having a small time interval. For example, the network device may first determine, based on the two first reference signals having a small time interval, whether there is a phase jump. If the network device determines that there is no phase jump, the network device determines that joint channel estimation can be performed across time units. On the contrary, if the network device determines that there is a phase jump, the network device estimates a phase jump difference based on the two first reference signals having a small time interval and performs compensation, and then performs cross-time-unit joint channel estimation based on a compensation value and the two first reference signals having a small time interval. In this way, accuracy of determining whether cross-time-unit joint channel estimation can be performed across time units is improved.

Based on embodiments shown in FIG. 2 to FIG. 8, it can be learned that, when the reference signals provided in embodiments of this application is described, embodiments shown in FIG. 2 to FIG. 8 are described by using only an example in which the transmission duration includes two adjacent time units: the first time unit and the second time unit. Alternatively, a quantity of time units in the transmission duration may be extended to L, and L is an integer greater than 2. For example, L is equal to 3, that is, the transmission duration includes three adjacent time units. The three time units are sequentially a first time unit, a second time unit, and a third time unit. In this case, when the terminal sends, to the network device within the transmission duration, the uplink signals that each include the uplink data and the first reference signal, at least two different implementations may be included.

Figure 10:
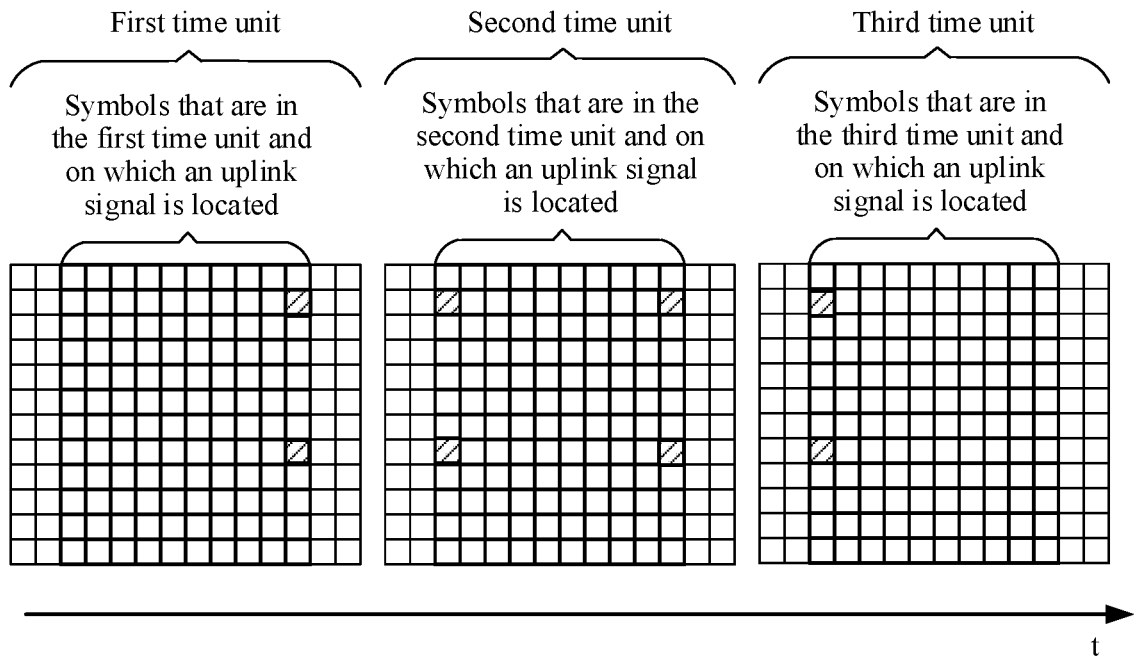
FIG. 10 is a schematic diagram of three time units that carry first reference signals according to an embodiment of this application.

In a possible implementation, the first reference signals are carried on the first N symbols in symbols that are in the second time unit and the third time unit and on which the uplink signals are located, and the first reference signal is not carried in the first time unit; and the first reference signals are carried on the last M symbols in symbols that are in the first time unit and the second time unit and on which the uplink signals are located, and the first reference signal is not carried in the third time unit. In this way, resource overheads occupied by the first reference signals in the first time unit and the second time unit can be reduced. For example, FIG. 10 is a schematic diagram of three time units that carry first reference signals according to an embodiment of this application.

Figure 11:
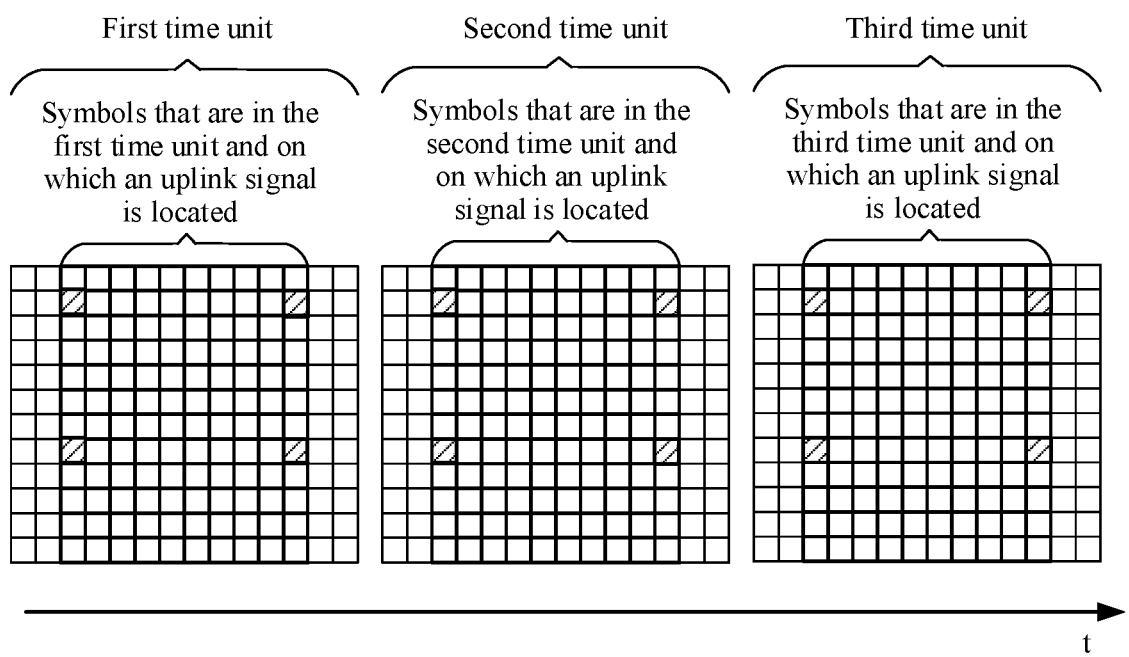
FIG. 11 is another schematic diagram of three time units that carry first reference signals according to an embodiment of this application.

In another possible implementation, to enable the terminal not to distinguish a sequence of the first time unit, the second time unit, and the third time unit, the first reference signals may be carried on the first N symbols in symbols that are in the first time unit, the second time unit, and the third time unit and on which the uplink signals are located, and the first reference signals may be carried on the last M symbols in the symbols that are in the first time unit, the second time unit, and the third time unit and on which the uplink signals are located. In this way, the terminal does not need to distinguish between the first time unit, the second time unit, and the third time unit, so that complexity of the terminal is reduced. For example, FIG. 11 is another schematic diagram of three time units that carry first reference signals according to an embodiment of this application.

Figure 12:
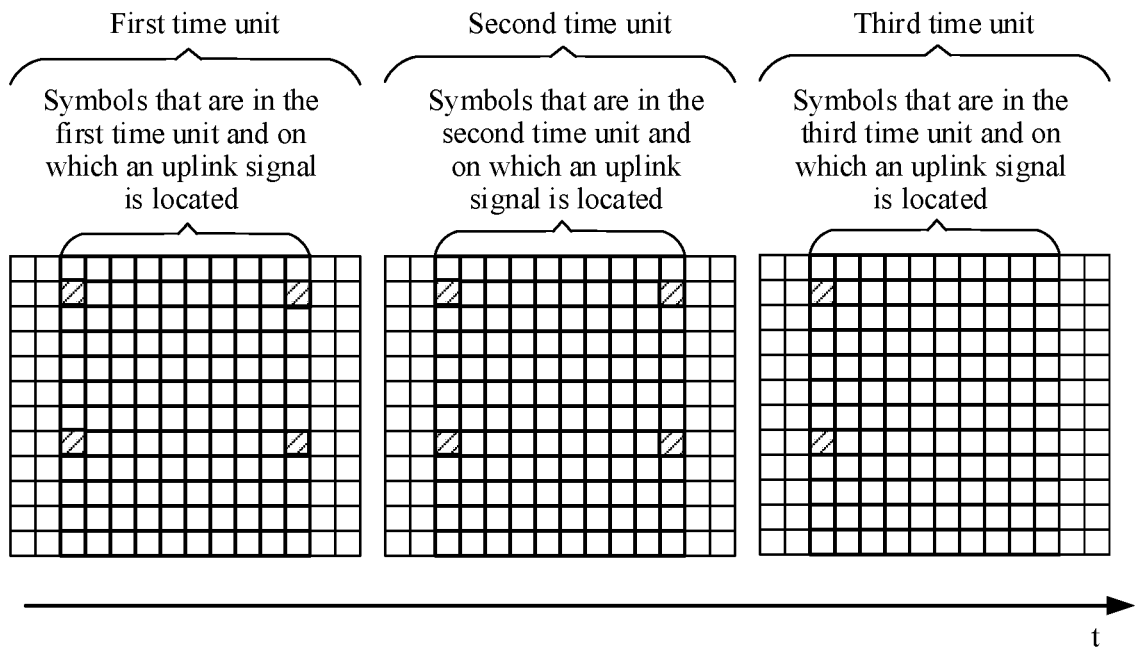
FIG. 12 is still another schematic diagram of three time units that carry first reference signals according to an embodiment of this application.

Certainly, alternatively, the first reference signals may be carried on the first N symbols in symbols that are in the first time unit, the second time unit, and the third time unit and on which the uplink signals are located, the first reference signals may be carried on the last M symbols in the symbols that are in the first time unit and the second time unit and on which the uplink signals are located, and the first reference signal may not be carried on the last M symbols in symbols that are in the third time unit and on which the uplink signal is located. For example, FIG. 12 is still another schematic diagram of three time units that carry first reference signals according to an embodiment of this application.

It should be noted that, when the transmission duration includes the three adjacent time units, the three possible implementations are merely used as an example for description in embodiments of this application, but this does not mean that embodiments of this application are limited thereto.

Figure 13:
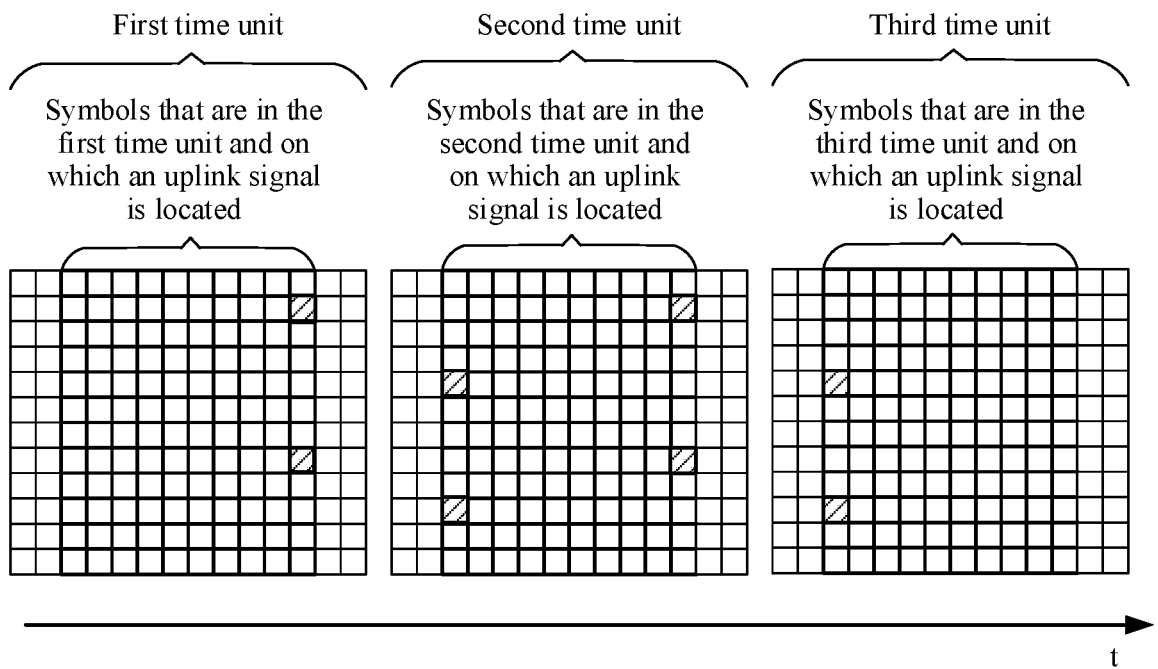
FIG. 13 is yet another schematic diagram of three time units that carry first reference signals according to an embodiment of this application.
Figure 14:
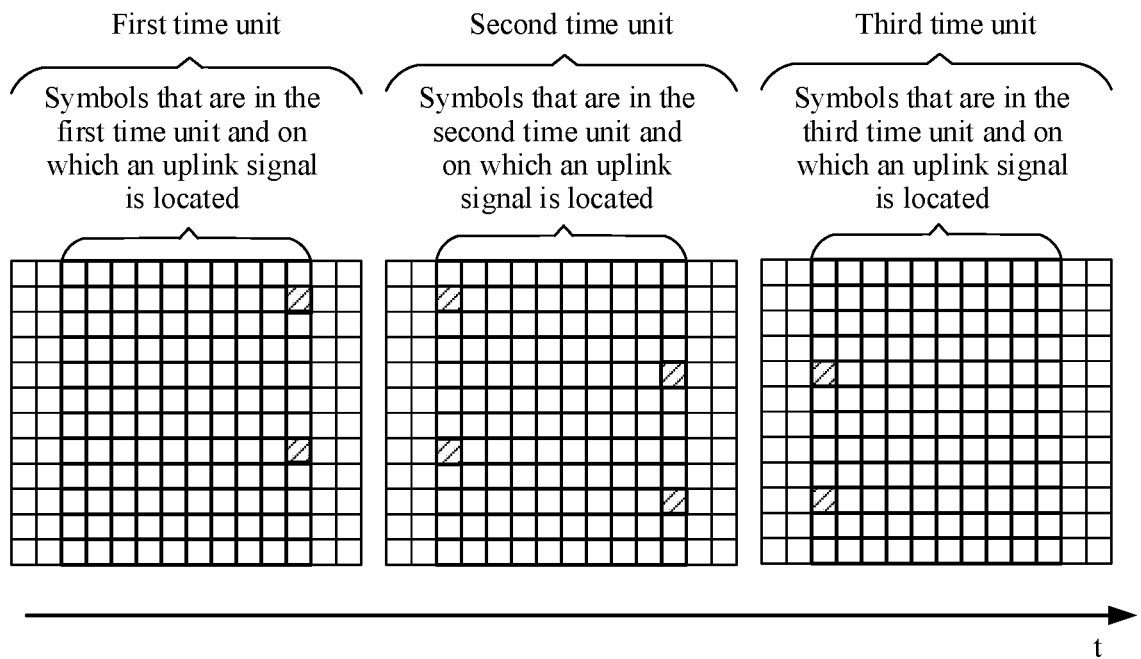
FIG. 14 is a schematic diagram of three time units that carry first reference signals according to an embodiment of this application.

With reference to FIG. 10, when the first reference signals are carried on the first N symbols in the symbols that are in the second time unit and the third time unit and on which the uplink signals are located, and the first reference signal is not carried in the first time unit; and the first reference signals are carried on the last M symbols in the symbols that are in the first time unit and the second time unit and on which the uplink signals are located, and the first reference signal is not carried in the third time unit, a frequency domain resource occupied by the M symbols may be different from a frequency domain resource occupied by the N symbols. For example, subcarriers that carry the first reference signals and that are in the last M symbols in the symbols that are in the first time unit and the second time unit and on which the uplink signals are located may be different from subcarriers that carry the first reference signals and that are in the first N symbols in the symbols that are in the second time unit and the third time unit and on which the uplink signals are located. FIG. 13 is a yet another schematic diagram of three time units that carry first reference signals according to an embodiment of this application. Certainly, to avoid that a phase jump determining result is affected because a frequency of the subcarrier that carries the first reference signal and that is in the first time unit is different from a frequency of the subcarrier that carries the first reference signal and that is in the second time unit, the subcarrier that carries the first reference signal and that is in the last M symbols in the symbols that are in the first time unit and on which the uplink signal is located may be the same as the subcarrier that carries the first reference signal and that is in the first N symbols in the symbols that are in the second time unit and on which the uplink signal is located. FIG. 14 is a schematic diagram of three time units that carry first reference signals according to an embodiment of this application. This can avoid that the phase jump determining result is affected because the frequency of the subcarrier that carries the first reference signal and that is in the first time unit is different from the frequency of the subcarrier that carries the first reference signal and that is in the second time unit, thereby improving accuracy of determining whether there is a phase jump. Similarly, to avoid that a phase jump determining result is affected because a frequency of the subcarrier that carries the first reference signal and that is in the second time unit is different from a frequency of the subcarrier that carries the first reference signal and that is in the third time unit, the subcarrier that carries the first reference signal and that is in the last M symbols in the symbols that are in the second time unit and on which the uplink signal is located may be the same as the subcarrier that carries the first reference signal and that is in the first N symbols in the symbols that are in the third time unit and on which the uplink signal is located. This can avoid that the phase jump determining result is affected because the frequency of the subcarrier that carries the first reference signal and that is in the first time unit is different from the frequency of the subcarrier that carries the first reference signal and that is in the second time unit, thereby improving accuracy of determining whether there is a phase jump.

Figure 15:
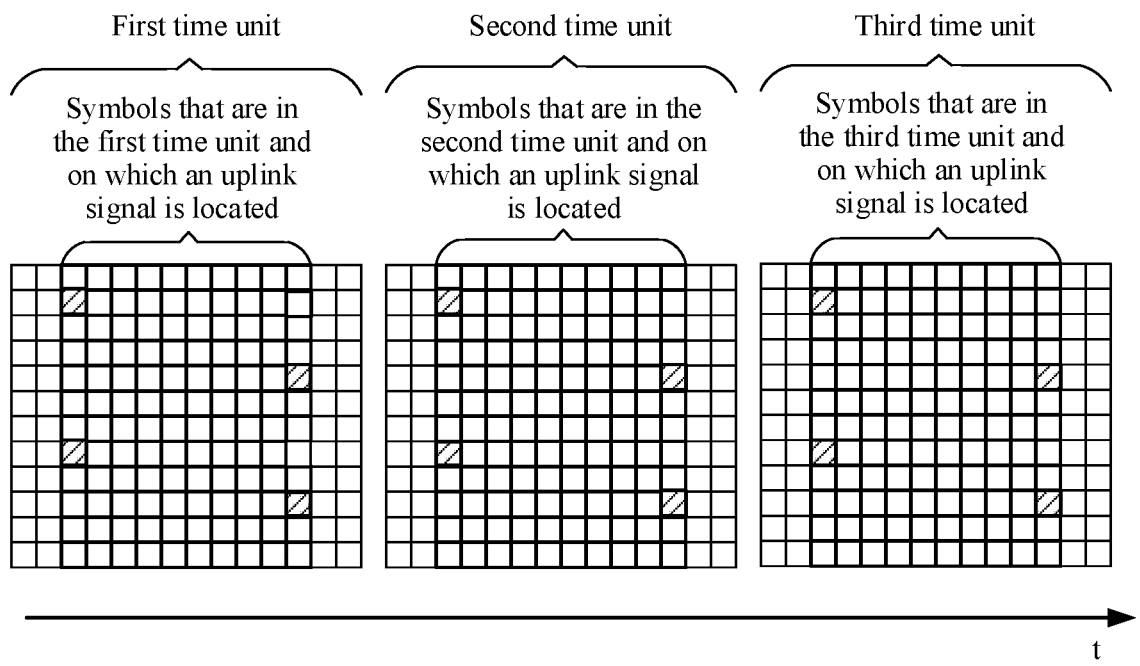
FIG. 15 is another schematic diagram of three time units that carry first reference signals according to an embodiment of this application.
Figure 16:
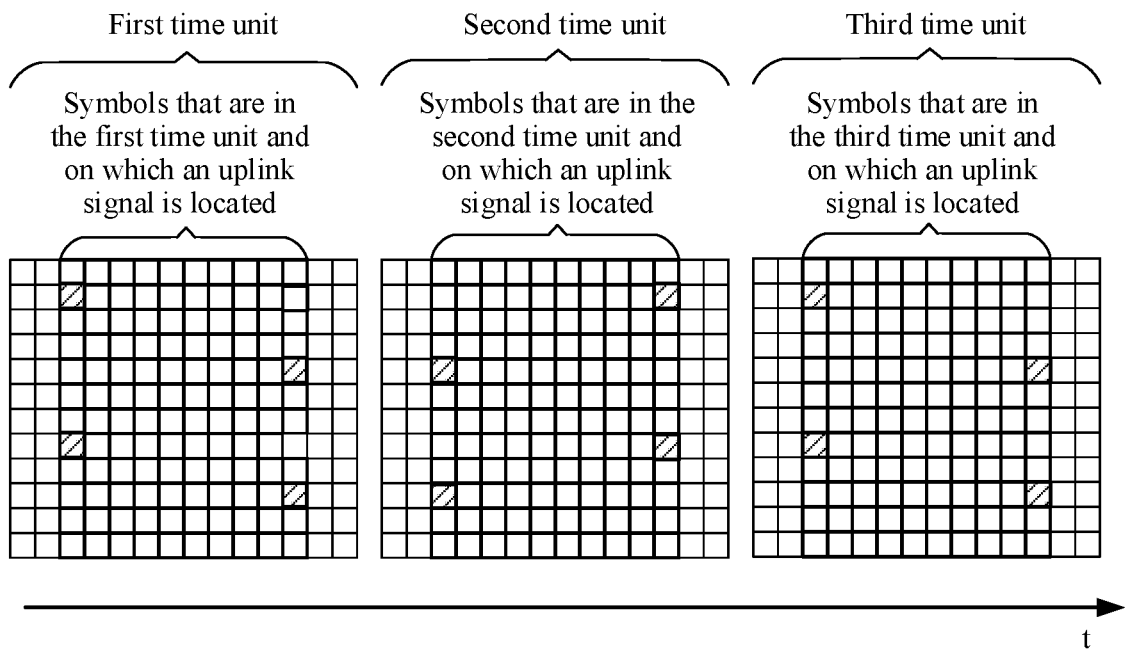
FIG. 16 is still another schematic diagram of three time units that carry first reference signals according to an embodiment of this application.

With reference to FIG. 11, when the first reference signals are carried on the first N symbols in the symbols that are in the first time unit, the second time unit, and the third time unit and on which the uplink signals are located, and the first reference signals are carried on the last M symbols in the symbols that are in the first time unit, the second time unit, and the third time unit and on which the uplink signals are located, subcarriers that carry the first reference signals and that are in the first N symbols in the symbols that are in the first time unit, the second time unit, and the third time unit and on which the uplink signals are located may be the same as subcarriers that carry the first reference signals and that are in the last M symbols in the symbols that are in the first time unit, the second time unit, and the third time unit and on which the uplink signals are located, as shown in FIG. 11. Certainly, the subcarriers that carry the first reference signals and that are in the first N symbols in the symbols that are in the first time unit, the second time unit, and the third time unit and on which the uplink signals are located may alternatively be different from the subcarriers that carry the first reference signals and that are in the last M symbols in the symbols that are in the first time unit, the second time unit, and the third time unit and on which the uplink signals are located. FIG. 15 is another schematic diagram of three time units that carry first reference signals according to an embodiment of this application. Certainly, to avoid that a phase jump determining result is affected because a frequency of the subcarrier that carries the first reference signal and that is in the first time unit is different from a frequency of the subcarrier that carries the first reference signal and that is in the second time unit, the subcarrier that carries the first reference signal and that is in the last M symbols in the symbols that are in the first time unit and on which the uplink signal is located may be the same as the subcarrier that carries the first reference signal and that is in the first N symbols in the symbols that are in the second time unit and on which the uplink signal is located. FIG. 16 is still another schematic diagram of three time units that carry first reference signals according to an embodiment of this application. This can avoid that the phase jump determining result is affected because the frequency of the subcarrier that carries the first reference signal and that is in the first time unit is different from the frequency of the subcarrier that carries the first reference signal and that is in the second time unit, thereby improving accuracy of determining whether there is a phase jump. Similarly, to avoid that a phase jump determining result is affected because a frequency of the subcarrier that carries the first reference signal and that is in the second time unit is different from a frequency of the subcarrier that carries the first reference signal and that is in the third time unit, the subcarrier that carries the first reference signal and that is in the last M symbols in the symbols that are in the second time unit and on which the uplink signal is located may be the same as the subcarrier that carries the first reference signal and that is in the first N symbols in the symbols that are in the third time unit and on which the uplink signal is located. This can avoid that the phase jump determining result is affected because the frequency of the subcarrier that carries the first reference signal and that is in the first time unit is different from the frequency of the subcarrier that carries the first reference signal and that is in the second time unit, thereby improving accuracy of determining whether there is a phase jump.

It should be noted that, in the foregoing embodiments shown in FIG. 2 to FIG. 16, only an example in which the first reference signal is the DMRS is used for description, but this does not mean that embodiments of this application are limited thereto. When the first reference signal is a reference signal different from the DMRS, for example, a JD-RS signal, a difference from the foregoing embodiments in which the first reference signal is the DMRS is: The last M symbols that are used to carry the JD-RS and that are in the symbols that are in the first time unit and on which the uplink signal is located and the first N symbols that are used to carry the JD-RS and that are in the symbols that are in the second time unit and on which the uplink signal is located are jointly determined based on other reference signals, for example, symbols on which DMRSs are currently located. A symbol in which the DMRS is located is different from a symbol in which the first reference signal JD-RS is located. If a DMRS has been carried on a symbol, even if the network device configures a JD-RS for the terminal, the terminal does not send the JD-RS in the symbol in an actual uplink signal sending process. The reason is as follows: The network device may determine, by using the DMRS on the symbol, whether there is a phase jump on a channel. In this way, the JD-RS does not need to be sent, so that resources can be effectively saved. In addition, if the JD-RS is sent in the symbol that carries the DMRS, orthogonality of the DMRS may be damaged. Consequently, channel estimation quality is reduced.

It may be understood that, because the first reference signals are used to determine whether there is a phase jump between two slots, the first reference signals do not need to be used to estimate channels at all frequencies in a transmission process. Therefore, to reduce resource overheads of the JD-RSs, when the JD-RSs are set, subcarriers on which the JD-RSs are located are some or all of subcarriers on which the DMRSs are located. In other words, an RE on which the JD-RS is located is also an RE on which the DMRS is located. For example, REs on which the JD-RSs are located are the $2^{nd}$ RE and the $8^{th}$ RE, and REs on which the DMRSs are located are the $2^{nd}$ RE, the $4^{th}$ RE, the $6^{th}$ RE, the $8^{th}$ RE, the $10^{th}$ RE, and the $12^{th}$ RE. A benefit is as follows: If a JD-RS is not sent because a DMRS is carried on a symbol, the DMRS may replace the JD-RS on an RE, and be used together with a JD-RS on a same RE in an adjacent time unit to detect a phase jump.

Figure 17:
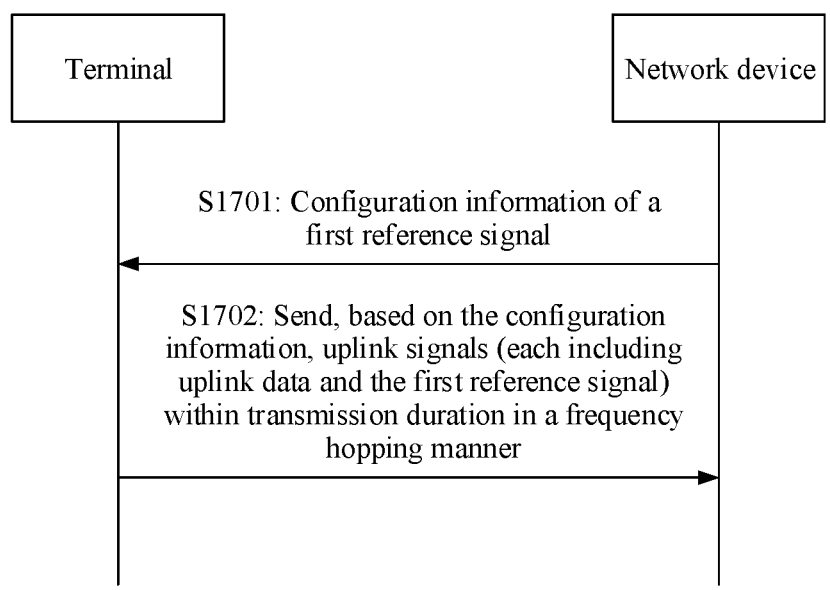
FIG. 17 is a schematic flowchart of another reference signal sending method according to an embodiment of this application.

Embodiments shown in FIG. 2 to FIG. 16 describe in detail a technical solution in which a terminal sends uplink signals to a network device in a non-frequency-hopping manner in a possible scenario. The following describes in detail a technical solution in which a terminal sends uplink signals to a network device in a frequency hopping manner in another possible scenario. For example, a first reference signal is a DMRS. FIG. 17 is a schematic flowchart of another reference signal sending method according to an embodiment of this application. The reference signal sending method may include the following steps.

S1701: A network device sends configuration information of a first reference signal to a terminal.

Optionally, the configuration information may include at least one of sequence indication information, time domain resource indication information, and frequency domain resource indication information. The sequence indication information is used to indicate a sequence corresponding to the first reference signal, the time domain resource indication information is used to indicate a symbol that carries the first reference signal, and the frequency domain resource indication information is used to indicate a subcarrier that carries the first reference signal.

After receiving the configuration information, of the first reference signal, sent by the network device, the terminal may determine the first reference signal based on the configuration information of the first reference signal. In this way, the terminal may send, to the network device within transmission duration in a frequency hopping manner, uplink signals that each include the first reference signal, that is, perform the following S1702.

S1702: The terminal sends, based on the configuration information, the uplink signals to the network device within the transmission duration in the frequency hopping manner.

The uplink signals each include uplink data and the first reference signal. The transmission duration includes a first time unit, a second time unit, a third time unit, and a fourth time unit that are consecutive. A frequency domain resource occupied by the uplink signal in the first time unit is not exactly the same as a frequency domain resource occupied by the uplink signal in the second time unit. The frequency domain resource occupied by the uplink signal in the first time unit is the same as a frequency domain resource occupied by the uplink signal in the third time unit. The frequency domain resource occupied by the uplink signal in the second time unit is the same as a frequency domain resource occupied by the uplink signal in the fourth time unit. The first reference signals are carried on the last M symbols in symbols that are in the first time unit and the second time unit and on which the uplink signals are located. The first reference signals are further carried on the first N symbols in symbols that are in the third time unit and the fourth time unit and on which the uplink signals are located. A subcarrier that carries the first reference signal and that is in the last M symbols in the first time unit is the same as a subcarrier that carries the first reference signal and that is in the first N symbols in the third time unit. A subcarrier that carries the first reference signal and that is in the last M symbols in the second time unit is the same as a subcarrier that carries the first reference signal and that is in the first N symbols in the fourth time unit. N and M are integers greater than or equal to 1.

Figure 18:
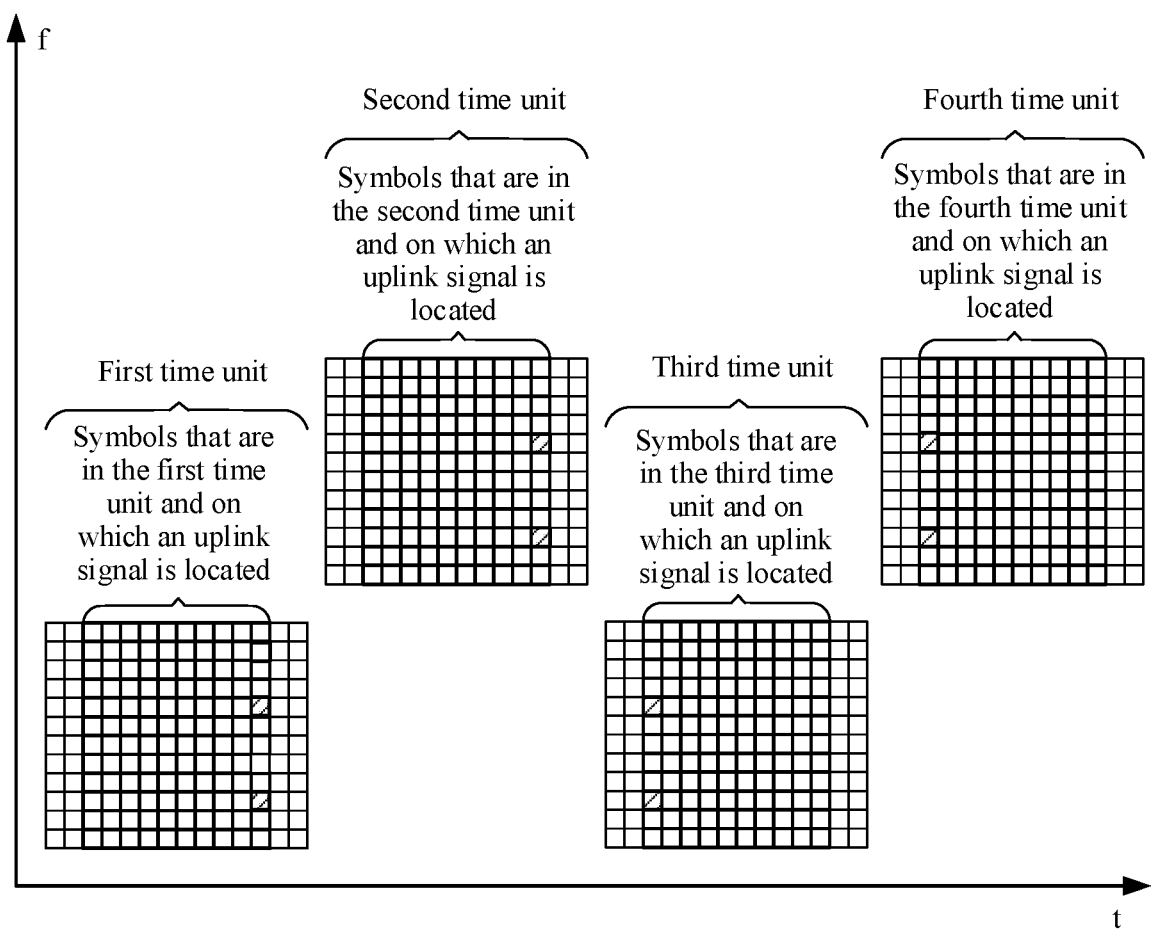
FIG. 18 is a schematic diagram of four time units that carry first reference signals according to an embodiment of this application.
Figure 19:
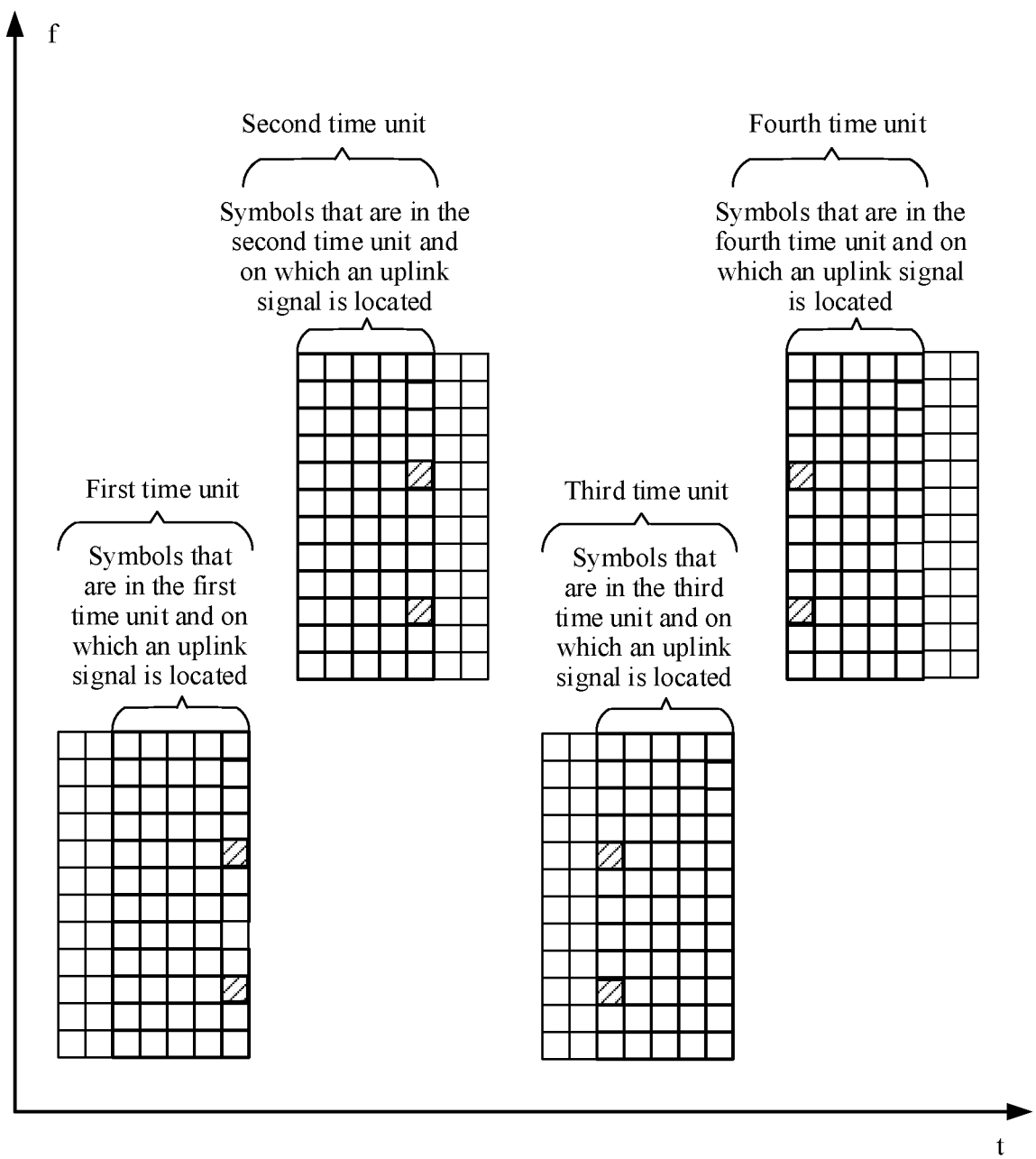
FIG. 19 is another schematic diagram of four time units that carry first reference signals according to an embodiment of this application.

It should be noted that, when the terminal sends the uplink signals, if there is an inter-slot jump, a time unit is a slot. FIG. 18 is a schematic diagram of four time units that carry first reference signals according to an embodiment of this application. If there is an intra-slot jump, a time unit is a hop in a slot. FIG. 19 is another schematic diagram of four time units that carry first reference signals according to an embodiment of this application.

It can be learned that, in embodiments of this application, to avoid that a phase jump determining result is affected because a frequency of the subcarrier that carries the first reference signal and that is in the first time unit is different from a frequency of the subcarrier that carries the first reference signal and that is in the third time unit, the subcarrier that carries the first reference signal and that is in the last M symbols in the first time unit is the same as the subcarrier that carries the first reference signal and that is in the first N symbols in the third time unit, as shown in FIG. 18 or FIG. 19. This can avoid that the phase jump determining result is affected because the frequency of the subcarrier that carries the first reference signal and that is in the first time unit is different from the frequency of the subcarrier that carries the first reference signal and that is in the third time unit, thereby improving accuracy of determining whether there is a phase jump. Similarly, to avoid that a phase jump determining result is affected because a frequency of the subcarrier that carries the first reference signal and that is in the second time unit is different from a frequency of the subcarrier that carries the first reference signal and that is in the fourth time unit, the subcarrier that carries the first reference signal and that is in the last M symbols in the second time unit is the same as the subcarrier that carries the first reference signal and that is in the first N symbols in the fourth time unit, still as shown in FIG. 18 or FIG. 19. This can avoid that the phase jump determining result is affected because the frequency of the subcarrier that carries the first reference signal and that is in the second time unit is different from the frequency of the subcarrier that carries the first reference signal and that is in the fourth time unit, thereby improving accuracy of determining whether there is a phase jump. Certainly, if impact caused by different frequencies of the subcarriers that carry the first reference signals is not considered, the subcarrier that carries the first reference signal and that is in the last M symbols in the first time unit may be different from the subcarrier that carries the first reference signal and that is in the first N symbols in the third time unit. Similarly, the subcarrier that carries the first reference signal and that is in the last M symbols in the second time unit may also be different from the subcarrier that carries the first reference signal and that is in the first N symbols in the fourth time unit.

Similarly, it may be understood that the terminal needs to determine information in two aspects before sending, to the network device within the transmission duration in the frequency hopping manner, the uplink signals that each include the uplink data and the first reference signal. According to a first aspect, the terminal needs to first generate the first reference information based on the received configuration information of the first reference signal. According to a second aspect, after generating the first reference signal and before sending, to the network device within the transmission duration in the frequency hopping manner, the uplink signals that each include the first reference signal, the terminal needs to determine time domain resources and frequency domain resources occupied by the first reference signals. The following describes in detail how to determine the information in the two aspects.

For the first aspect, the terminal needs to first generate the first reference signal based on the received configuration information of the first reference signal. When the terminal generates the first reference signal based on the configuration information of the first reference signal, an example in which the first reference signal is a JD-RS is used. A method for generating the JD-RS is similar to the method for generating the JD-RS in the embodiment shown in FIG. 2. For details, refer to related descriptions in S202. Details are not described herein again.

For the second aspect, the terminal determines the time domain resources and the frequency domain resources occupied by the first reference signals. In this case, with reference to FIG. 18 or FIG. 19, when the terminal determines the time domain resources occupied by the first reference signals, the time domain resources occupied by the first reference signals may be the last M symbols in the symbols that are in the first time unit and the second time unit and on which the uplink signals are located and the first N symbols in the symbols that are in the third time unit and the fourth time unit and on which the uplink signals are located. When the terminal determines the frequency domain resources occupied by the first reference signals, usually, because the first reference signals are used to determine whether there is a phase jump between two slots, the first reference signals do not need to be used to estimate channels on all frequencies in a transmission process. Therefore, in frequency domain, in symbols on which the first reference signals are located, an interval between any two adjacent subcarriers occupied by the first reference signals is K subcarriers, that is, one first reference signal is set for every K subcarriers. K is an integer greater than or equal to 1. In this way, resource overheads of the JD-RSs can be reduced. For example, K is equal to 6, to be specific, one first reference signal is set for every six subcarriers. Certainly, K may alternatively be an integer multiple of 6. For example, a value range of M is {6, 12, 24, 36, . . . }. An advantage is as follows: In all resource blocks RBs that carry the first reference signals, indexes of REs occupied by the first reference signals are the same. This helps the network device use a same phase jump detection method on all the RBs. An RE may be defined as a symbol in time domain or a subcarrier in frequency domain.

Figure 20:
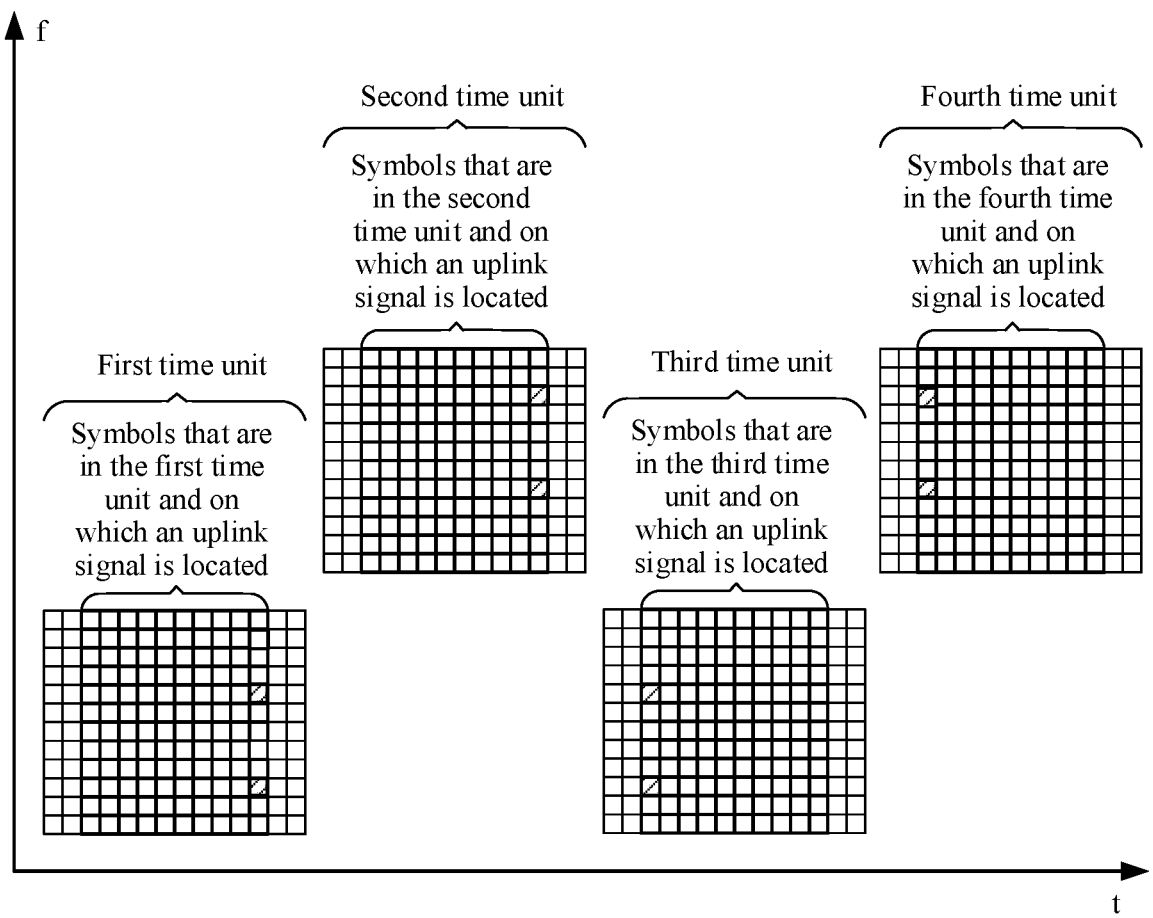
FIG. 20 is still another schematic diagram of four time units that carry first reference signals according to an embodiment of this application.
Figure 21:
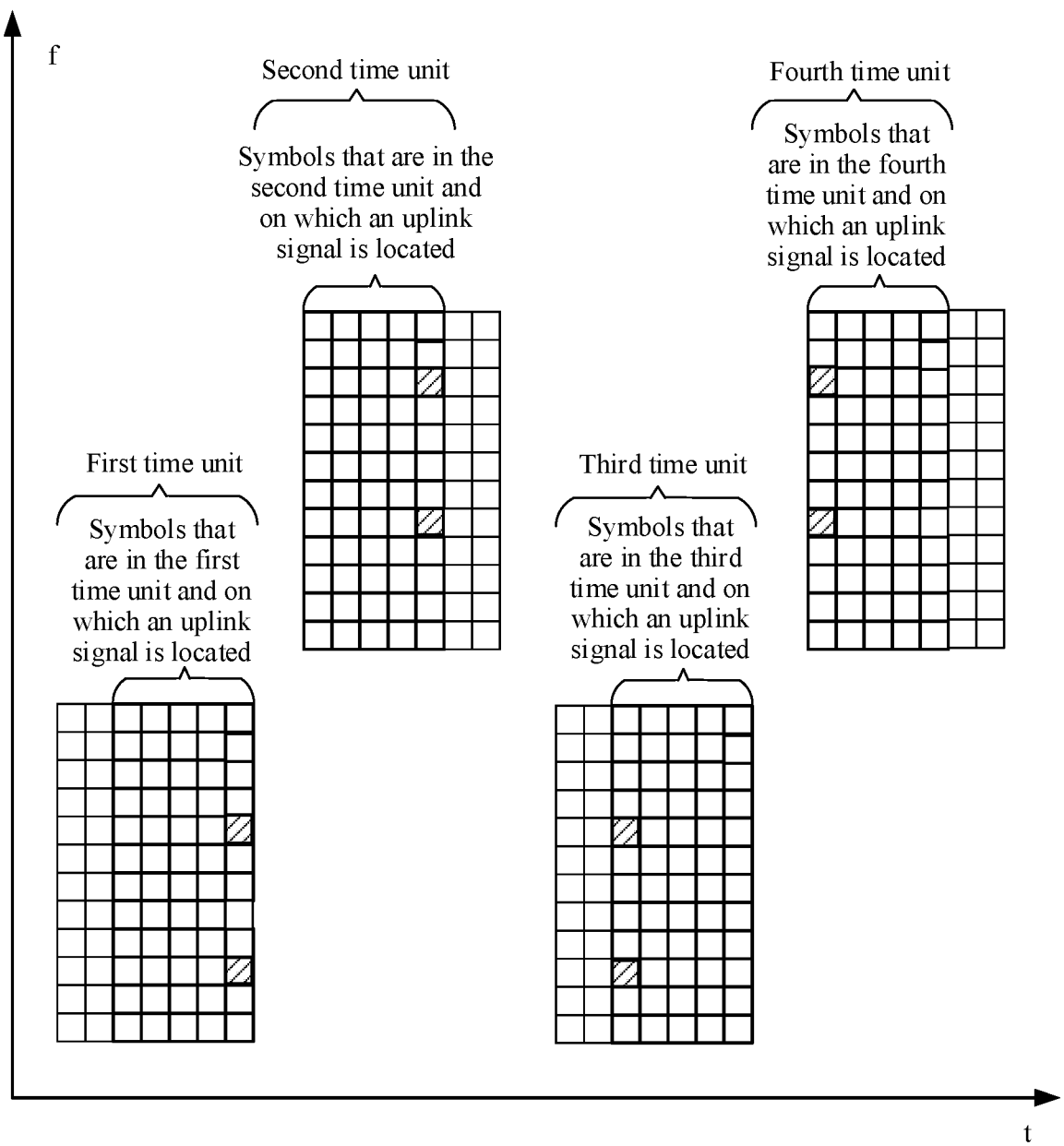
FIG. 21 is yet another schematic diagram of four time units that carry first reference signals according to an embodiment of this application.

When the first reference signals are carried on the last M symbols in the symbols that are in the first time unit and the second time unit and on which the uplink signals are located and the first N symbols in the symbols that are in the third time unit and the fourth time unit and on which the uplink signals are located, a frequency domain resource occupied by the M symbols may be the same as a frequency domain resource occupied by the N symbols. For example, the subcarrier in the M symbols that carries the first reference signal is the same as the subcarrier that carries the first reference signal and that is in the first N symbols in the second time unit, as shown in FIG. 18 or FIG. 19. Certainly, the subcarrier in the M symbols that carries the first reference signal may alternatively be different from the subcarrier that carries the first reference signal and that is in the first N symbols in the second time unit. FIG. 20 is still another schematic diagram of four time units that carry first reference signals according to an embodiment of this application. FIG. 21 is yet another schematic diagram of four time units that carry first reference signals according to an embodiment of this application.

It can be learned from the foregoing descriptions that, when the transmission duration includes two time units: the first time unit and the second time unit, it is limited in S1702 that the first reference signals are carried on the last M symbols in the symbols that are in the first time unit and the second time unit and on which the uplink signals are located, and the first reference signals are carried on the first N symbols in the symbols that are in the third time unit and the fourth time unit and on which the uplink signals are located, as shown in FIG. 18 or FIG. 19. However, it is not further limited whether the first reference signals are carried on the first N symbols in the symbols that are in the first time unit and the second time unit and on which the uplink signals are located and whether the first reference signals are carried on the last M symbols in the symbols that are in the third time unit and the fourth time unit and on which the uplink signals are located. In a possible implementation, to reduce resource overheads occupied by the first reference signals in the first time unit, the second time unit, the third time unit, and the fourth time unit, the first reference signals may be carried only on the last M symbols in the symbols that are in the first time unit and the second time unit and on which the uplink signals are located, and the first reference signals may be carried only on the first N symbols in the symbols that are in the third time unit and the fourth time unit and on which the uplink signals are located, but the first reference signals are not carried on the first N symbols in the symbols that are in the first time unit and the second time unit and on which the uplink signals are located, and the first reference signals are not carried on the last M symbols in the symbols that are in the third time unit and the fourth time unit and on which the uplink signals are located, still as shown in FIG. 18 or FIG. 19.

Figure 22:
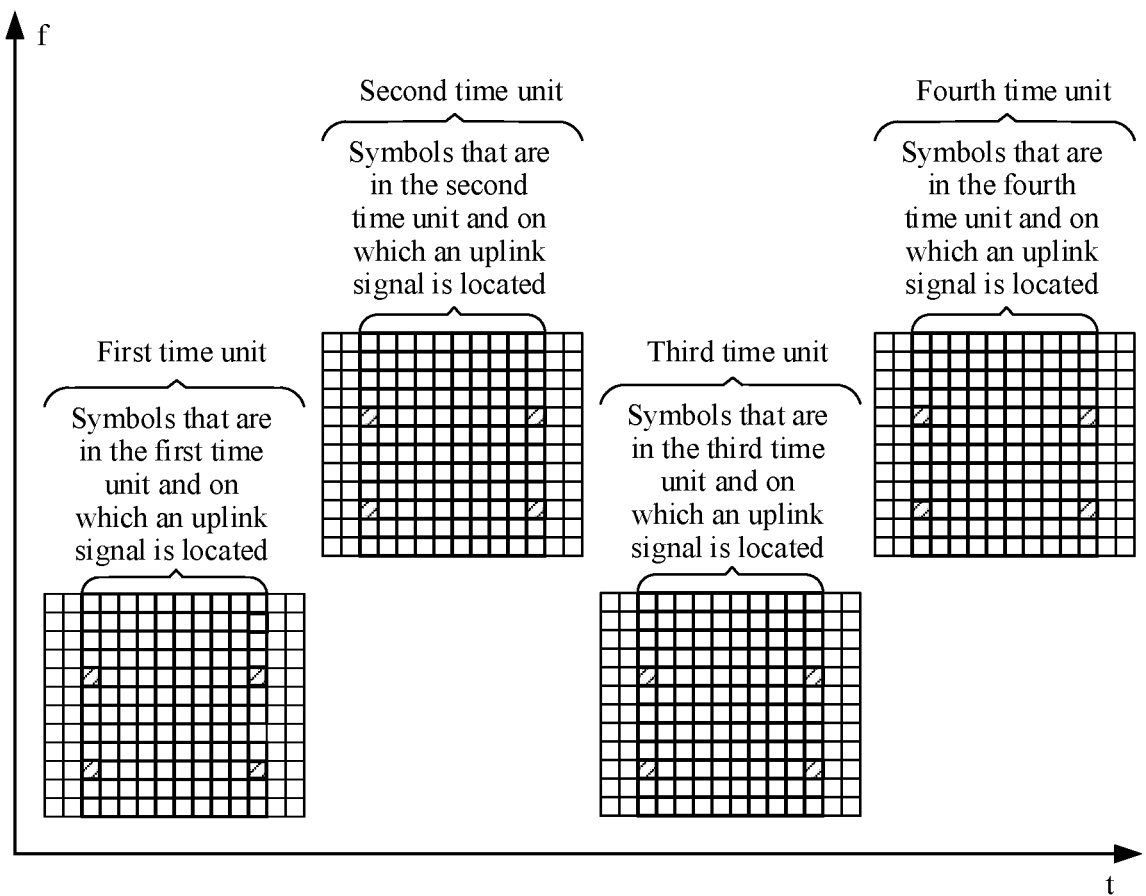
FIG. 22 is a schematic diagram of four time units that carry first reference signals according to an embodiment of this application.
Figure 23:
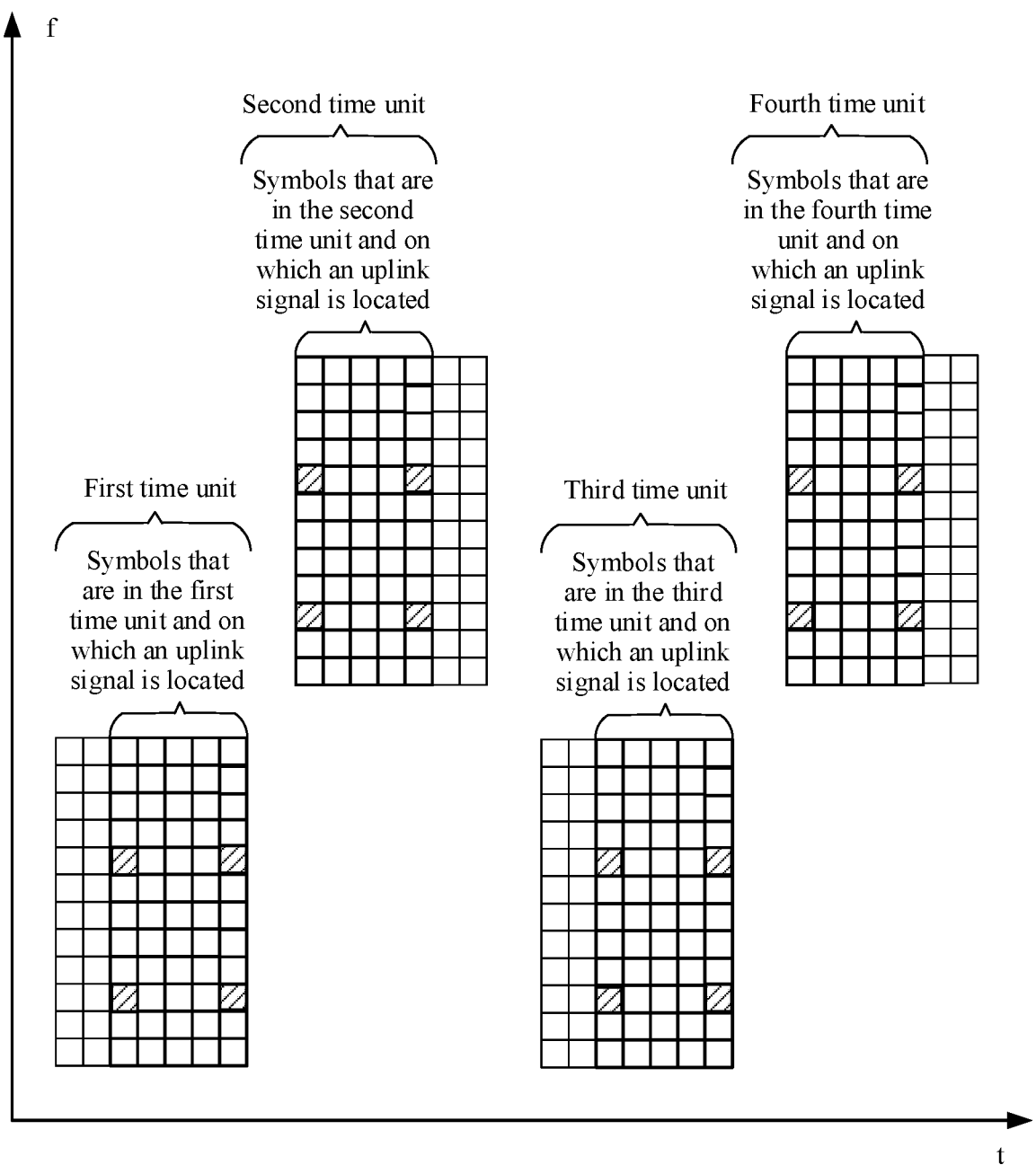
FIG. 23 is another schematic diagram of four time units that carry first reference signals according to an embodiment of this application.

In another possible implementation, to enable the terminal not to distinguish a sequence of the first time unit, the second time unit, the third time unit, and the fourth time unit, the first reference signals may be carried on the first N symbols in the symbols that are in the first time unit, the second time unit, the third time unit, and the fourth time unit and on which the uplink signals are located, that is, the first reference signal is carried on the first N symbols in symbols that are in each time unit and on which the uplink signal is located, and the first reference signal is carried on the last M symbols in the symbols that are in each time unit and on which the uplink signal is located. In this way, the terminal does not need to distinguish between the first time unit, the second time unit, the third time unit, and the fourth time unit, so that complexity of the terminal is reduced. FIG. 22 is a schematic diagram of four time units that carry first reference signals according to an embodiment of this application. FIG. 23 is another schematic diagram of four time units that carry first reference signals according to an embodiment of this application.

Figure 24:
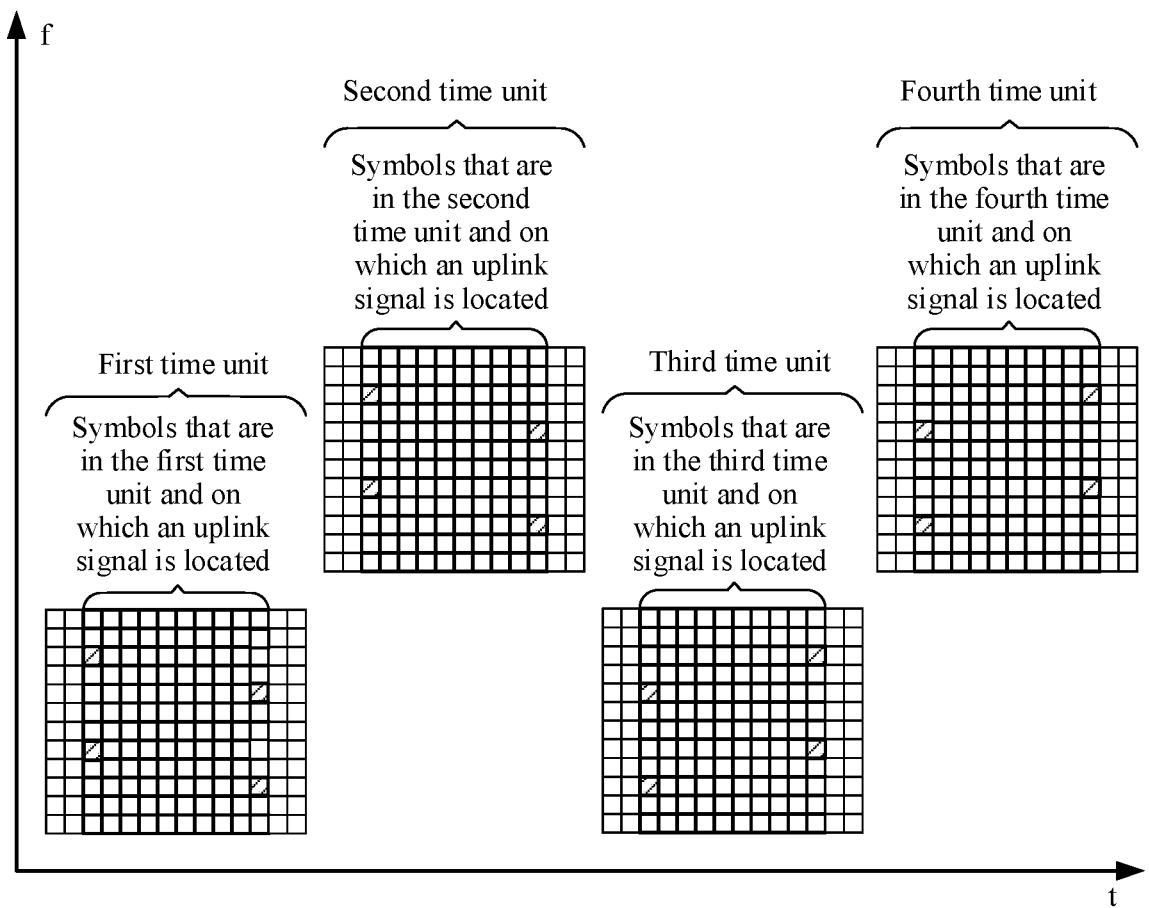
FIG. 24 is still another schematic diagram of four time units that carry first reference signals according to an embodiment of this application.
Figure 25:
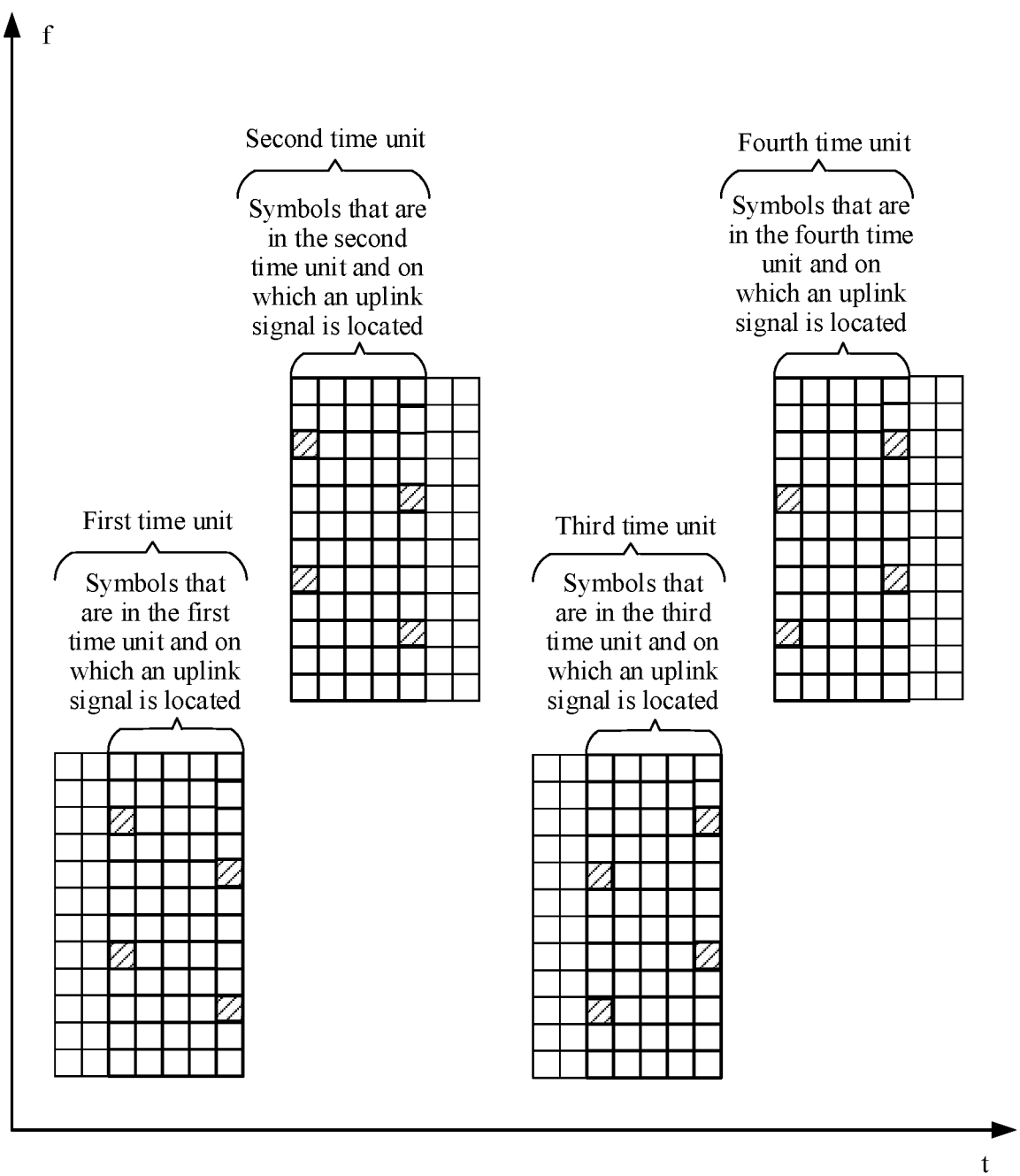
FIG. 25 is yet another schematic diagram of four time units that carry first reference signals according to an embodiment of this application.

With reference to FIG. 22 or FIG. 23, when the first reference signals are carried on the first N symbols and the last M symbols in the symbols that are in the first time unit and on which the uplink signal is located, a subcarrier that carries the first reference signal and that is in the first N symbols in the symbols that are in the first time unit and on which the uplink signal is located may be the same as a subcarrier that carries the first reference signal and that is in the last M symbols in the symbols that are in the first time unit and on which the uplink signal is located, as shown in FIG. 22 or FIG. 23. Certainly, the subcarrier that carries the first reference signal and that is in the first N symbols in the symbols that are in the first time unit and on which the uplink signal is located may alternatively be different from the subcarrier that carries the first reference signal and that is in the last M symbols in the symbols that are in the first time unit and on which the uplink signal is located. For example, FIG. 24 is still another schematic diagram of four time units that carry first reference signals according to an embodiment of this application. FIG. 25 is yet another schematic diagram of four time units that carry first reference signals according to an embodiment of this application. Certainly, to avoid that a determining result is inaccurate because the subcarrier that carries the first reference signal and that is in the last M symbols in the symbols that are in the first time unit and on which the uplink signal is located is different from the subcarrier that carries the first reference signal and that is in the first N symbols in the symbols that are in the third time unit and on which the uplink signal is located, the subcarrier that carries the first reference signal and that is in the last M symbols in the symbols that are in the first time unit and on which the uplink signal is located needs to be the same as the subcarrier that carries the first reference signal and that is in the first N symbols in the symbols that are in the third time unit and on which the uplink signal is located. Similarly, when the first reference signals are carried on the first N symbols in the symbols that are in the second time unit and on which the uplink signal is located and the last M symbols in the symbols that are in the fourth time unit and on which the uplink signal is located, a subcarrier that carries the first reference signal and that is in the first N symbols in the symbols that are in the second time unit and on which the uplink signal is located may be the same as a subcarrier that carries the first reference signal and that is in the last M symbols in the symbols that are in the fourth time unit and on which the uplink signal is located, as shown in FIG. 22 or FIG. 23. Certainly, the subcarrier that carries the first reference signal and that is in the first N symbols in the symbols that are in the second time unit and on which the uplink signal is located may alternatively be different from the subcarrier that carries the first reference signal and that is in the last M symbols in the symbols that are in the fourth time unit and on which the uplink signal is located, as shown in FIG. 24 or FIG. 25. Certainly, to avoid that a determining result is inaccurate because the subcarrier that carries the first reference signal and that is in the last M symbols in the symbols that are in the second time unit and on which the uplink signal is located is different from the subcarrier that carries the first reference signal and that is in the first N symbols in the symbols that are in the fourth time unit and on which the uplink signal is located, the subcarrier that carries the first reference signal and that is in the last M symbols in the symbols that are in the second time unit and on which the uplink signal is located needs to be the same as the subcarrier that carries the first reference signal and that is in the first N symbols in the symbols that are in the fourth time unit and on which the uplink signal is located.

It should be particularly noted that, when the first reference signals are carried on the first N symbols in the symbols that are in the first time unit, the second time unit, the third time unit, and the fourth time unit and on which the uplink signals are located, and the first reference signals are carried on the last M symbols in the symbols that are in the first time unit, the second time unit, the third time unit, and the fourth time unit and on which the uplink signals are located, with reference to FIG. 22 or FIG. 23, the uplink signal sending method provided in embodiments of this application is not limited to being applied to four time units scheduled by using a same piece of DCI, and may be further extended to four time units scheduled by using a plurality pieces of DCI. For example, the first time unit may be the $1^{st}$ time unit scheduled by using second DCI. Because the first reference signal is carried on the first N symbols in the symbols that are in the first time unit and on which the uplink signal is located, and the first reference signal is carried on the last M symbols in symbols on which the uplink signal is located and that are in the last time unit that is scheduled by using first DCI and that is located before the first time unit, whether there is a phase jump between uplink transmission scheduled by using the two pieces of DCI may be determined based on the first reference signal carried on the last M symbols in the symbols on which the uplink signal is located and that are in the last time unit scheduled by using the first DCI and the first reference signal carried on the first N symbols in the symbols on which the uplink signal is located and that are in the first time unit scheduled by using the second DCI, and whether channel estimation can be performed across time units is determined based on a determining result. In this way, channel estimation is performed across time units scheduled by using different DCI.

After generating the first reference signal, and determining the time domain resources and the frequency domain resources occupied by the first reference signals, within the transmission duration, the terminal may include the first reference signals in the last M symbols in the symbols that are in the first time unit and the second time unit and on which the uplink signals are located, include the first reference signals in the first N symbols in the symbols that are in the third time unit and the fourth time unit and on which the uplink signals are located, and separately send, to the network device in the first time unit, the second time unit, the third time unit, and the fourth time unit in the frequency hopping manner, the uplink signals that each include the uplink data and the first reference signal. Correspondingly, the network device may perform cross-time-unit joint channel estimation on the first time unit and the third time unit based on the first reference signal carried in the first time unit and the first reference signal carried in the third time unit, where a time interval between the two first reference signals is small; and may perform cross-time-unit joint channel estimation on the second time unit and the fourth time unit based on the first reference signal carried in the second time unit and the first reference signal carried in the fourth time unit, where a time interval between the two first reference signals is small. For example, the network device may first determine, based on the two first reference signals having a small time interval, whether there is a phase jump. If the network device determines that there is no phase jump, the network device determines that joint channel estimation can be performed across time units. On the contrary, if the network device determines that there is a phase jump, the network device estimates a phase jump difference based on the two first reference signals having a small time interval and performs compensation, and then performs cross-time-unit joint channel estimation based on a compensation value and the two first reference signals having a small time interval. In this way, accuracy of determining whether cross-time-unit joint channel estimation can be performed across time units is improved.

Similarly, it should be noted that, in the foregoing embodiments shown in FIG. 17 to FIG. 25, only an example in which the first reference signal is the DMRS is used for description, but this does not mean that embodiments of this application are limited thereto. When the first reference signal is a reference signal different from the DMRS, for example, a JD-RS signal, a difference from the foregoing embodiments in which the first reference signal is the DMRS is: The last M symbols that are used to carry the JD-RS and that are in the symbols that are in the first time unit and on which the uplink signal is located and the first N symbols that are used to carry the JD-RS and that are in the symbols that are in the second time unit and on which the uplink signal is located are jointly determined based on other reference signals, for example, symbols on which DMRSs are currently located. A symbol in which the DMRS is located is different from a symbol in which the first reference signal JD-RS is located. If a DMRS has been carried on a symbol, even if the network device configures a JD-RS for the terminal, the terminal does not send the JD-RS in the symbol in an actual uplink signal sending process. The reason is as follows: The network device may determine, by using the DMRS on the symbol, whether there is a phase jump on a channel. In this way, the JD-RS does not need to be sent, so that resources can be effectively saved. In addition, if the JD-RS is sent in the symbol that carries the DMRS, orthogonality of the DMRS may be damaged. Consequently, channel estimation quality is reduced.

It may be understood that, because the first reference signals are used to determine whether there is a phase jump between two slots, the first reference signals do not need to be used to estimate channels at all frequencies in a transmission process. Therefore, to reduce resource overheads of the JD-RSs, when the JD-RSs are set, subcarriers on which the JD-RSs are located are some or all of subcarriers on which the DMRSs are located. In other words, an RE on which the JD-RS is located is also an RE on which the DMRS is located. For example, REs on which the JD-RSs are located are the $2^{nd}$ RE and the $8^{th}$ RE, and REs on which the DMRSs are located are the $2^{nd}$ RE, the $4^{th}$ RE, the $6^{th}$ RE, the $8^{th}$ RE, the $10^{th}$ RE, and the $12^{th}$ RE. A benefit is as follows: If a JD-RS is not sent because a DMRS is carried on a symbol, the DMRS may replace the JD-RS on an RE, and be used together with a JD-RS on a same RE in an adjacent time unit to detect a phase jump.

Figure 26:
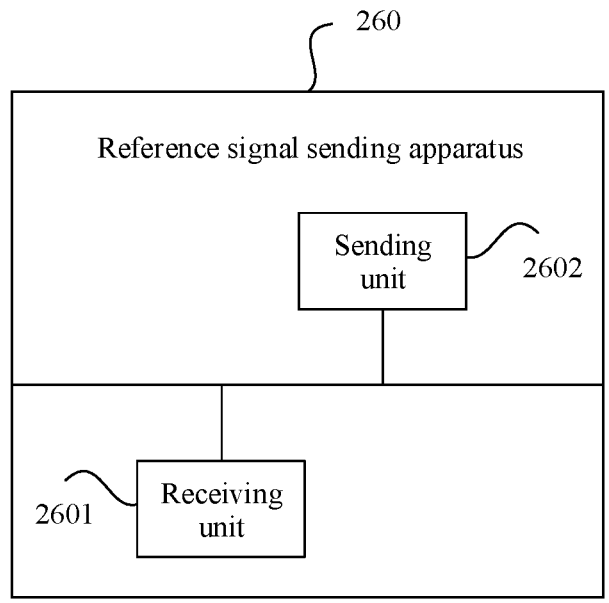
FIG. 26 is a schematic diagram of a structure of a reference signal sending apparatus according to an embodiment of this application.

FIG. 26 is a schematic diagram of a structure of a reference signal sending apparatus 260 according to an embodiment of this application. For example, refer to FIG. 26. The reference signal sending apparatus 260 may include:

a receiving unit 2601, configured to receive configuration information of a first reference signal from a network device; and a sending unit 2602, configured to send, based on the configuration information, uplink signals to the network device within transmission duration, where the uplink signals each include uplink data and the first reference signal, the transmission duration includes a first time unit and a second time unit, the first time unit is adjacent to and located before the second time unit, the first reference signal is carried on the first N symbols in symbols that are in the second time unit and on which the uplink signal is located, the first reference signal is carried on the last M symbols in symbols that are in the first time unit and on which the uplink signal is located, and N and M are integers greater than or equal to 1.

Optionally, the first reference signal is carried on the first N symbols in symbols that are in each time unit in the transmission duration and on which the uplink signal is located, and the first reference signal is carried on the last M symbols in the symbols that are in each time unit in the transmission duration and on which the uplink signal is located.

Optionally, the transmission duration includes L time units, and L is an integer greater than 1.

The first reference signal is carried on the first N symbols in symbols that are in each of the last L−1 time units and on which the uplink signal is located, and the first reference signal is not carried in the $1^{st}$ time unit in the L time units; and the first reference signal is carried on the last M symbols in symbols that are in each of the first L−1 time units and on which the uplink signal is located, and the first reference signal is not carried in the last time unit in the L time units.

Optionally, in symbols on which the first reference signals are located, an interval between any two adjacent subcarriers occupied by the first reference signals is K subcarriers, and K is an integer greater than or equal to 1.

Optionally, a subcarrier that carries the first reference signal and that is in the last M symbols in the first time unit is the same as a subcarrier that carries the first reference signal and that is in the first N symbols in the second time unit.

It should be noted that the reference signal sending apparatus 260 in the embodiment shown in FIG. 26 may be a terminal, or may be a component (for example, a chip or a circuit) that can be configured in the terminal.

The reference signal sending apparatus 260 shown in this embodiment of this application may perform the reference signal sending method on the terminal side in embodiments shown in FIG. 2 to FIG. 16. Implementation principles and beneficial effects of the reference signal sending apparatus 260 are similar to implementation principles and beneficial effects of the reference signal sending method on the terminal side. Details are not described herein again.

Figure 27:
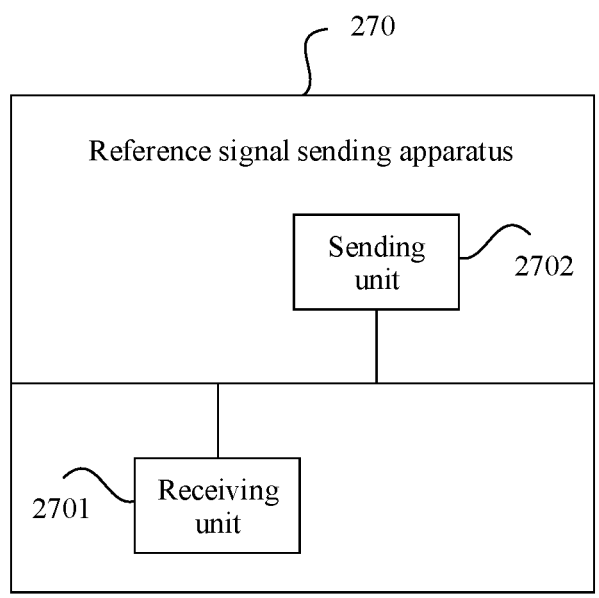
FIG. 27 is a schematic diagram of a structure of another reference signal sending apparatus according to an embodiment of this application.

FIG. 27 is a schematic diagram of a structure of another reference signal sending apparatus 270 according to an embodiment of this application. For example, refer to FIG. 27. The reference signal sending apparatus 270 may include:

a receiving unit 2701, configured to receive configuration information of a first reference signal from a network device; and a sending unit 2702, configured to send, based on the configuration information, uplink signals to the network device within transmission duration in a frequency hopping manner, where the uplink signals each include uplink data and the first reference signal, and the transmission duration includes a first time unit, a second time unit, a third time unit, and a fourth time unit that are consecutive, where a frequency domain resource occupied by the uplink signal in the first time unit is not exactly the same as a frequency domain resource occupied by the uplink signal in the second time unit; the frequency domain resource occupied by the uplink signal in the first time unit is the same as a frequency domain resource occupied by the uplink signal in the third time unit; the frequency domain resource occupied by the uplink signal in the second time unit is the same as a frequency domain resource occupied by the uplink signal in the fourth time unit; the first reference signals are carried on the last M symbols in symbols that are in the first time unit and the second time unit and on which the uplink signals are located; the first reference signals are further carried on the first N symbols in symbols that are in the third time unit and the fourth time unit and on which the uplink signals are located; a subcarrier that carries the first reference signal and that is in the last M symbols in the first time unit is the same as a subcarrier that carries the first reference signal and that is in the first N symbols in the third time unit; a subcarrier that carries the first reference signal and that is in the last M symbols in the second time unit is the same as a subcarrier that carries the first reference signal and that is in the first N symbols in the fourth time unit; and N and M are integers greater than or equal to 1.

Optionally, a time unit is a hop in a slot.

Optionally, a time unit is a slot.

Optionally, the configuration information includes at least one of sequence indication information, time domain resource indication information, and frequency domain resource indication information.

The sequence indication information is used to indicate a sequence corresponding to the first reference signal, the time domain resource indication information is used to indicate a symbol that carries the first reference signal, and the frequency domain resource indication information is used to indicate a subcarrier that carries the first reference signal.

It should be noted that the reference signal sending apparatus 270 in the embodiment shown in FIG. 27 may be a terminal, or may be a component (for example, a chip or a circuit) that can be configured in the terminal.

The reference signal sending apparatus 270 shown in this embodiment of this application may perform the reference signal sending method on the terminal side in embodiments shown in FIG. 17 to FIG. 25. Implementation principles and beneficial effects of the reference signal sending apparatus 270 are similar to implementation principles and beneficial effects of the reference signal sending method on the terminal side. Details are not described herein again.

Figure 28:
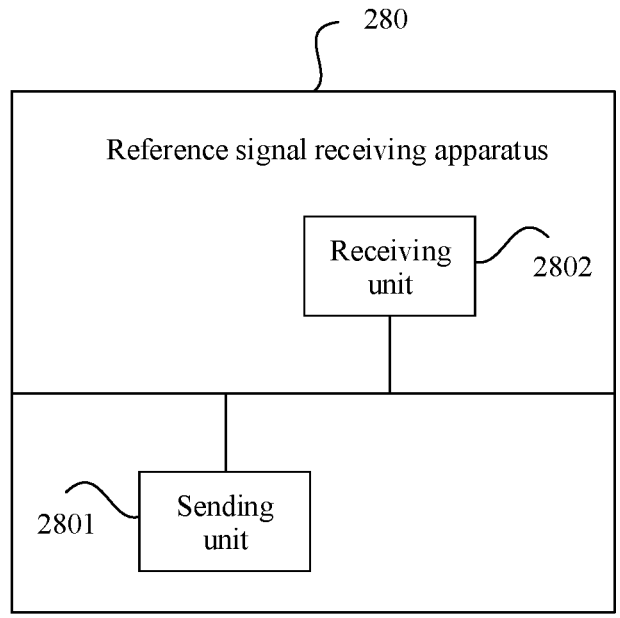
FIG. 28 is a schematic diagram of a structure of a reference signal receiving apparatus according to an embodiment of this application.

FIG. 28 is a schematic diagram of a structure of a reference signal receiving apparatus 280 according to an embodiment of this application. For example, refer to FIG. 28. The reference signal receiving apparatus 280 may include:

a sending unit 2801, configured to send configuration information of a first reference signal; and a receiving unit 2802, configured to receive uplink signals from a terminal in at least two time units, where the uplink signals each include uplink data and the first reference signal that corresponds to the configuration information, the at least two time units include a first time unit and a second time unit, the first time unit is adjacent to and located before the second time unit, the first reference signal is carried on the first N symbols in symbols that are in the second time unit and on which the uplink signal is located, the first reference signal is carried on the last M symbols in symbols that are in the first time unit and on which the uplink signal is located, and N and M are integers greater than or equal to 1.

Optionally, the first reference signal is carried on the first N symbols in symbols that are in each of the at least two time units and on which the uplink signal is located, and the first reference signal is carried on the last M symbols in the symbols that are in each of the at least two time units and on which the uplink signal is located.

Optionally, the at least two time units include L time units, and L is an integer greater than 1.

The first reference signal is carried on the first N symbols in symbols that are in each of the last L−1 time units and on which the uplink signal is located, and the first reference signal is not carried in the $1^{st}$ time unit in the L time units; and the first reference signal is carried on the last M symbols in symbols that are in each of the first L−1 time units and on which the uplink signal is located, and the first reference signal is not carried in the last time unit in the L time units.

Optionally, in symbols on which the first reference signals are located, an interval between any two adjacent subcarriers occupied by the first reference signals is K subcarriers, and K is an integer greater than or equal to 1.

Optionally, a subcarrier that carries the first reference signal and that is in the last M symbols in the first time unit is the same as a subcarrier that carries the first reference signal and that is in the first N symbols in the second time unit.

It should be noted that the reference signal receiving apparatus 280 in the embodiment shown in FIG. 28 may be a terminal, or may be a component (for example, a chip or a circuit) that can be configured in the terminal.

The reference signal receiving apparatus 280 shown in this embodiment of this application may perform the reference signal receiving method on the terminal side in embodiments shown in FIG. 2 to FIG. 16. Implementation principles and beneficial effects of the reference signal receiving apparatus 280 are similar to implementation principles and beneficial effects of the reference signal receiving method on the terminal side. Details are not described herein again.

Figure 29:
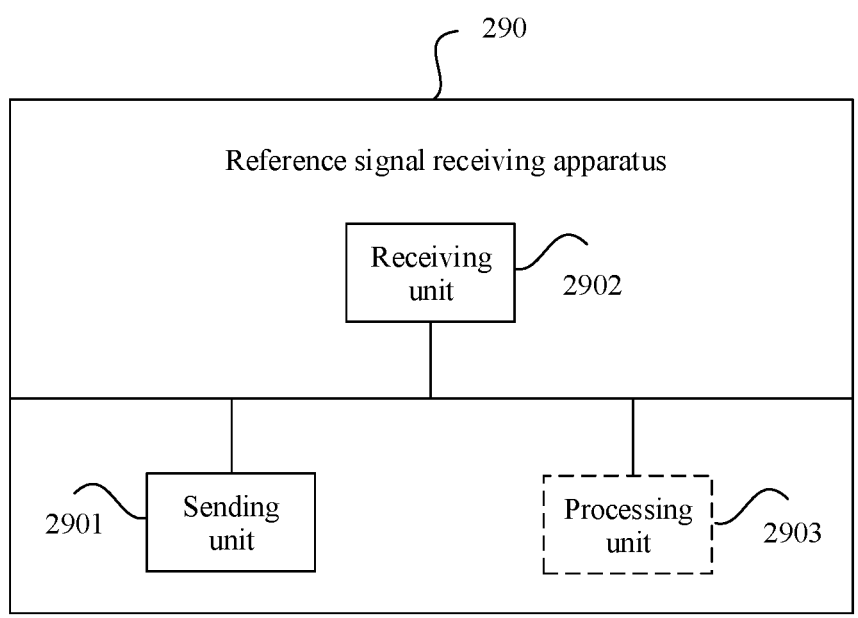
FIG. 29 is a schematic diagram of a structure of a reference signal receiving apparatus according to an embodiment of this application.

FIG. 29 is a schematic diagram of a structure of a reference signal receiving apparatus 290 according to an embodiment of this application. For example, refer to FIG. 29. The reference signal receiving apparatus 290 may include:

a sending unit 2901, configured to send configuration information of a first reference signal; and a receiving unit 2902, configured to receive, in at least two time units, uplink signals transmitted in a frequency hopping manner, where the uplink signals each include uplink data and the first reference signal that corresponds to the configuration information, and the at least two time units include a first time unit, a second time unit, a third time unit, and a fourth time unit that are consecutive, where a frequency domain resource occupied by the uplink signal in the first time unit is not exactly the same as a frequency domain resource occupied by the uplink signal in the second time unit; the frequency domain resource occupied by the uplink signal in the first time unit is the same as a frequency domain resource occupied by the uplink signal in the third time unit; the frequency domain resource occupied by the uplink signal in the second time unit is the same as a frequency domain resource occupied by the uplink signal in the fourth time unit; the first reference signals are carried on the last M symbols in symbols that are in the first time unit and the second time unit and on which the uplink signals are located; the first reference signals are further carried on the first N symbols in symbols that are in the third time unit and the fourth time unit and on which the uplink signals are located; a subcarrier that carries the first reference signal and that is in the last M symbols in the first time unit is the same as a subcarrier that carries the first reference signal and that is in the first N symbols in the third time unit; a subcarrier that carries the first reference signal and that is in the last M symbols in the second time unit is the same as a subcarrier that carries the first reference signal and that is in the first N symbols in the fourth time unit; and N and M are integers greater than or equal to 1.

Optionally, a time unit is a hop in a slot.

Optionally, a time unit is a slot.

Optionally, the configuration information includes at least one of sequence indication information, time domain resource indication information, and frequency domain resource indication information.

The sequence indication information is used to indicate a sequence corresponding to the first reference signal, the time domain resource indication information is used to indicate a symbol that carries the first reference signal, and the frequency domain resource indication information is used to indicate a subcarrier that carries the first reference signal.

Optionally, the reference signal receiving apparatus 290 further includes a processing unit 2903. The processing unit 2903 is configured to perform joint channel estimation based on the first reference signals.

It should be noted that the reference signal receiving apparatus 290 in the embodiment shown in FIG. 29 may be a terminal, or may be a component (for example, a chip or a circuit) that can be configured in the terminal.

The reference signal receiving apparatus 290 shown in this embodiment of this application may perform the reference signal receiving method on the terminal side in embodiments shown in FIG. 15 to FIG. 17. Implementation principles and beneficial effects of the reference signal receiving apparatus 290 are similar to implementation principles and beneficial effects of the reference signal receiving method on the terminal side. Details are not described herein again.

An embodiment of this application further provides a communication system. The communication system may include the reference signal sending apparatus shown in FIG. 26 and the reference signal receiving apparatus shown in FIG. 28; or may include the reference signal sending apparatus shown in FIG. 27 and the reference signal receiving apparatus shown in FIG. 29. Implementation principles and beneficial effects of the reference signal sending apparatus and the reference signal receiving apparatus are similar to implementation principles and beneficial effects of the reference signal sending method and the reference signal receiving method. Details are not described herein again.

Figure 30:
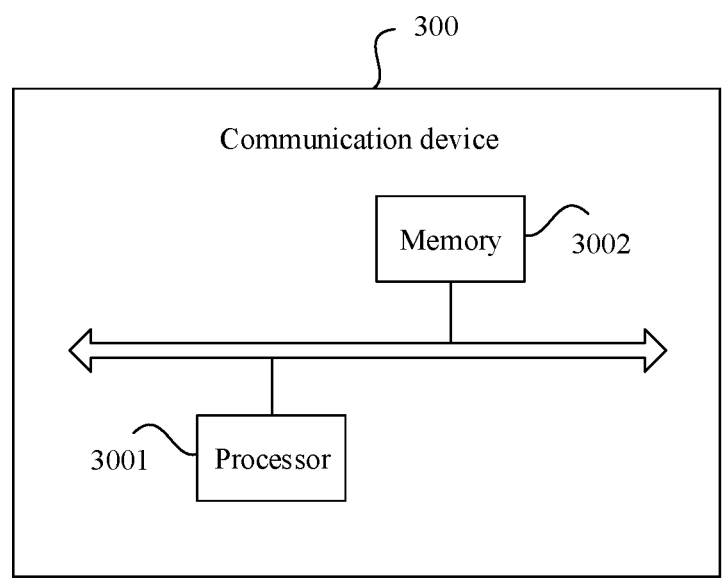
FIG. 30 is a schematic diagram of a structure of a communication device according to an embodiment of this application.

FIG. 30 is a schematic diagram of a structure of a communication device 300 according to an embodiment of this application. For example, refer to FIG. 30. The communication device 300 may include a processor 3001 and a memory 3002.

The memory 3002 is configured to store program instructions.

The processor 3001 is configured to: read the program instructions in the memory 3002, and perform, according to the program instructions in the memory 3002, a technical solution of the reference signal sending method on a terminal side in any one of the foregoing embodiments. An implementation principle and beneficial effects of the method are similar to an implementation principle and beneficial effects of the reference signal sending method. Details are not described herein again. Alternatively, the processor 3001 is configured to: read the program instructions in the memory 3002, and perform, according to the program instructions in the memory 3002, a technical solution of the reference signal receiving method on a network device side in any one of the foregoing embodiments. An implementation principle and beneficial effects of the method are similar to an implementation principle and beneficial effects of the reference signal receiving method. Details are not described herein again.

An embodiment of this application further provides a readable storage medium. The readable storage medium stores a computer program. When the computer program is executed, the computer program is used to perform a technical solution of the reference signal sending method on a terminal side in any one of the foregoing embodiments. An implementation principle and beneficial effects of the method are similar to an implementation principle and beneficial effects of the reference signal sending method. Details are not described herein again. Alternatively, when the computer program is executed, the computer program is used to perform a technical solution of the reference signal receiving method on a network device side in any one of the foregoing embodiments. An implementation principle and beneficial effects of the method are similar to an implementation principle and beneficial effects of the reference signal receiving method. Details are not described herein again.

An embodiment of this application further provides a chip. The chip stores a computer program. When the computer program is executed by a processor, a technical solution of the reference signal sending method on a terminal side in any one of the foregoing embodiments is performed. An implementation principle and beneficial effects of the method are similar to an implementation principle and beneficial effects of the reference signal sending method. Details are not described herein again. Alternatively, when the computer program is executed by a processor, a technical solution of the reference signal receiving method on a network device side in any one of the foregoing embodiments is performed. An implementation principle and beneficial effects of the method are similar to an implementation principle and beneficial effects of the reference signal receiving method. Details are not described herein again.

The processor in the foregoing embodiments may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed through a hardware decoding processor, or may be performed and completed through a combination of hardware in the decoding processor and a software module. The software module may be located in a mature storage medium in the art, such as a random access memory (RAM), a flash memory, a read-only memory (ROM), a programmable read-only memory, an electrically erasable programmable memory, or a register. The storage medium is located in the memory, and a processor reads instructions in the memory and completes the steps in the foregoing methods in combination with hardware of the processor.

In the several embodiments provided in this application, it should be understood that the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of hardware combined with a software functional unit.

What is claimed is:

1. A reference signal sending method, comprising:
receiving configuration information of a first reference signal from a network device; and
sending, based on the configuration information, an uplink signal to the network device in each of at least two time units, wherein each uplink signal comprises uplink data and the first reference signal, the at least two time units comprise a first time unit and a second time unit, the first time unit is adjacent to and located before the second time unit, the first reference signal is carried on the earliest N symbols in a time domain of symbols that are in the second time unit and on which the uplink signal is located, the first reference signal is carried on the latest M symbols in the time domain of symbols that are in the first time unit and on which the uplink signal is located, and N and M are integers greater than or equal to 1;
wherein a subcarrier that carries the first reference signal and that is in the latest M symbols in the time domain of the first time unit is the same as a subcarrier that carries the first reference signal and that is in the earliest N symbols in the time domain of the second time unit.

2. The method according to claim 1, wherein the first reference signal is carried on the earliest N symbols in the time domain of symbols that are in each of the at least two time units and on which the uplink signal is located, and the first reference signal is carried on the latest M symbols in the time domain of the symbols that are in each of the at least two time units and on which the uplink signal is located.

3. The method according to claim 1, wherein:
the at least two time units comprise L time units, and L is an integer greater than 1;
the first reference signal is carried on the earliest N symbols in the time domain of symbols that are in each of the latest L−1 time units in the time domain and on which the uplink signal is located, and the first reference signal is not carried in the earliest time unit in the time domain in the L time units; and
the first reference signal is carried on the latest M symbols in the time domain of symbols that are in each of the earliest L−1 time units in the time domain and on which the uplink signal is located, and the first reference signal is not carried in the latest time unit in the time domain in the L time units.

4. The method according to claim 1, wherein in symbols on which the first reference signal is located, an interval between any two adjacent subcarriers occupied by the first reference signal is K subcarriers, and K is an integer greater than or equal to 1.

5. A reference signal receiving method, comprising:
sending configuration information of a first reference signal; and
receiving an uplink signal from a terminal in each of at least two time units, wherein each uplink signal comprises uplink data and the first reference signal that corresponds to the configuration information, the at least two time units comprise a first time unit and a second time unit, the first time unit is adjacent to and located before the second time unit, the first reference signal is carried on the earliest N symbols in a time domain of symbols that are in the second time unit and on which the uplink signal is located, the first reference signal is carried on the latest M symbols in the time domain of symbols that are in the first time unit and on which the uplink signal is located, and N and M are integers greater than or equal to 1;
wherein a subcarrier that carries the first reference signal and that is in the latest M symbols in the time domain of the first time unit is the same as a subcarrier that carries the first reference signal and that is in the earliest N symbols in the time domain of the second time unit.

6. The method according to claim 5, wherein the first reference signal is carried on the earliest N symbols in the time domain of symbols that are in each of the at least two time units and on which the uplink signal is located, and the first reference signal is carried on the latest M symbols in the time domain of the symbols that are in each of the at least two time units and on which the uplink signal is located.

7. The method according to claim 5, wherein:
the at least two time units comprise L time units, and L is an integer greater than 1;
the first reference signal is carried on the earliest N symbols in the time domain of symbols that are in each of the latest L−1 time units in the time domain and on which the uplink signal is located, and the first reference signal is not carried in the earliest time unit in the time domain in the L time units; and
the first reference signal is carried on the latest M symbols in the time domain of symbols that are in each of the earliest L−1 time units in the time domain and on which the uplink signal is located, and the first reference signal is not carried in the latest time unit in the time domain in the L time units.

8. The method according to claim 5, wherein in symbols on which the first reference signal is located, an interval between any two adjacent subcarriers occupied by the first reference signal is K subcarriers, and K is an integer greater than or equal to 1.

9. An apparatus, comprising:
at least one processor; and
one or more memories coupled to the at least one processor and storing programming instructions for execution by the at least one processor, to cause the apparatus to:
receive configuration information of a first reference signal from a network device; and
send, based on the configuration information, an uplink signal to the network device in each of at least two time units, wherein each uplink signal comprises uplink data and the first reference signal, the at least two time units comprise a first time unit and a second time unit, the first time unit is adjacent to and located before the second time unit, the first reference signal is carried on the earliest N symbols in a time domain of symbols that are in the second time unit and on which the uplink signal is located, the first reference signal is carried on the latest M symbols in the time domain of symbols that are in the first time unit and on which the uplink signal is located, and N and M are integers greater than or equal to 1;
wherein a subcarrier that carries the first reference signal and that is in the latest M symbols in the time domain of the first time unit is the same as a subcarrier that carries the first reference signal and that is in the earliest N symbols in the time domain of the second time unit.

10. The apparatus according to claim 9, wherein the first reference signal is carried on the earliest N symbols in the time domain of symbols that are in each of the at least two time units and on which the uplink signal is located, and the first reference signal is carried on the latest M symbols in the time domain of the symbols that are in each of the at least two time units and on which the uplink signal is located.

11. The apparatus according to claim 9, wherein:
the at least two time units comprise L time units, and L is an integer greater than 1;
the first reference signal is carried on the earliest N symbols in the time domain of symbols that are in each of the latest L−1 time units in the time domain and on which the uplink signal is located, and the first reference signal is not carried in the earliest time unit in the time domain in the L time units; and
the first reference signal is carried on the latest M symbols in the time domain of symbols that are in each of the earliest L−1 time units in the time domain and on which the uplink signal is located, and the first reference signal is not carried in the latest time unit in the time domain in the L time units.

12. The apparatus according to claim 9, wherein in symbols on which the first reference signal is located, an interval between any two adjacent subcarriers occupied by the first reference signal is K subcarriers, and K is an integer greater than or equal to 1.

\* \* \* \* \*